US009934513B2

(12) United States Patent
Cruickshank et al.

(10) Patent No.: US 9,934,513 B2
(45) Date of Patent: Apr. 3, 2018

(54) GIS DATA APPLIANCE FOR IDENTIFYING AND COMPARING DATA ASSOCIATED WITH GEOGRAPHIC REGIONS

(71) Applicant: Statebook LLC, Kingston, NY (US)

(72) Inventors: Calandra Cruickshank, Big Indian, NY (US); Ira Schuman, Scarsdale, NY (US)

(73) Assignee: STATEBOOK INTERNATIONAL INC., Kingston, NY (US)

( * ) Notice: Subject to any disclaimer, the term of this patent is extended or adjusted under 35 U.S.C. 154(b) by 479 days.

(21) Appl. No.: 14/145,386

(22) Filed: Dec. 31, 2013

(65) Prior Publication Data
US 2015/0186910 A1    Jul. 2, 2015

(51) Int. Cl.
G06Q 30/02    (2012.01)
G06F 17/30    (2006.01)

(52) U.S. Cl.
CPC ... *G06Q 30/0205* (2013.01); *G06F 17/30241* (2013.01)

(58) Field of Classification Search
USPC .......................................................... 705/7.34
See application file for complete search history.

(56) References Cited

U.S. PATENT DOCUMENTS

| | | | |
|---|---|---|---|
| 5,581,259 A * | 12/1996 | Schipper | G01C 21/20 342/357.31 |
| 5,614,913 A * | 3/1997 | Nichols | G01C 15/00 342/357.29 |
| 5,758,328 A | 5/1998 | Giovannoli | |
| 7,043,501 B2 | 5/2006 | Schiller | |
| 7,054,864 B1 | 5/2006 | Toomey | |
| 7,480,659 B2 | 1/2009 | Chmura et al. | |

(Continued)

OTHER PUBLICATIONS

Internet Archive Wayback of Statebook.com, Dec. 22, 2014, Statebook International.*

(Continued)

*Primary Examiner* — Beth V Boswell
*Assistant Examiner* — Joseph M Waesco
(74) *Attorney, Agent, or Firm* — Tarter Krinsky & Drogin LLP

(57) ABSTRACT

The invention includes systems and methods that permit users to research, identify and compare geographical regions for purposes of business formation, expansion or relocation decision making. The systems and methods include receiving, compiling and formatting data from a plurality of sources for use in the GIS system, populating a searchable database with the GIS data, and enabling the user to search the data using demographic, economic and other search parameters to identify and compare geographic locations of interest. The data further includes information provided by participating economic development organizations, enabling such data to be included in user search parameters, and permitting such third parties to provide commentary on regional data, and to market their regions and services to prospective businesses. The systems and methods also enable a user compare multiple regions of interest via an interface that displays different datasets selected by the user via tabs or buttons, and to generate reports using comparative data specifically selected by the user.

6 Claims, 25 Drawing Sheets

(56) References Cited

U.S. PATENT DOCUMENTS

| | | |
|---|---|---|
| 7,640,196 B2 | 12/2009 | Weiss |
| 7,680,859 B2 | 3/2010 | Schiller |
| 7,774,227 B2 | 8/2010 | Srivastava |
| 7,797,180 B2 | 9/2010 | Srivastava |
| 7,797,188 B2 | 9/2010 | Srivastava |
| 7,800,613 B2 | 9/2010 | Hanrahan |
| 7,917,852 B2 | 3/2011 | Wattenberg et al. |
| 7,945,582 B2 | 5/2011 | Ubalde et al. |
| 7,958,018 B2 | 6/2011 | Obrecht |
| 7,991,638 B1 | 8/2011 | House et al. |
| 8,055,578 B1 | 11/2011 | Hallman |
| 8,095,412 B1 | 1/2012 | Zias et al. |
| 8,332,259 B1 | 12/2012 | Zias et al. |
| 8,364,518 B1 | 1/2013 | Blake et al. |
| 8,433,617 B2 | 4/2013 | Goad et al. |
| 8,583,464 B2 * | 11/2013 | Lynn ............... G06Q 10/04 705/7.12 |
| 8,812,416 B2 | 8/2014 | Dousse |
| 9,400,183 B1 * | 7/2016 | Urmson ............ G01C 21/34 |
| 2001/0040984 A1 * | 11/2001 | Kambe ............. G01C 21/20 382/113 |
| 2004/0117358 A1 * | 6/2004 | von Kaenel ...... G06F 17/30241 |
| 2006/0206512 A1 * | 9/2006 | Hanrahan ......... G06F 17/30554 |
| 2010/0048242 A1 * | 2/2010 | Rhoads ............ G06F 17/30244 455/556.1 |
| 2011/0010674 A1 * | 1/2011 | Knize ............... G01C 21/20 715/849 |
| 2011/0161137 A1 * | 6/2011 | Ubalde ............. G06F 17/30241 705/7.34 |
| 2011/0276534 A1 | 11/2011 | Ubalde et al. |
| 2012/0089920 A1 * | 4/2012 | Eick ................. G08G 1/20 715/739 |
| 2013/0096987 A1 * | 4/2013 | Omitaomu ........ G06Q 30/0205 705/7.34 |
| 2013/0315446 A1 * | 11/2013 | Ben Tzvi ......... G06T 19/006 382/104 |
| 2014/0157172 A1 * | 6/2014 | Peery .............. G06Q 10/10 715/771 |
| 2015/0186910 A1 * | 7/2015 | Cruickshank ..... G06Q 30/0205 705/7.34 |

OTHER PUBLICATIONS

Census TIGERweb GeoServices REST API, Nov. 2, 2017, https://www.census.gov/data/developers/data-sets/TIGERweb-map-service.html, p. 1-3.*

International Search Report dated Apr. 9, 2015.

* cited by examiner

GIS DATA APPLIANCE FOR IDENTIFYING AND COMPARING DATA ASSOCIATED WITH GEOGRAPHIC REGIONS

BACKGROUND OF THE INVENTION

A geographic information system (GIS) is a system that associates data according to the geographic coordinates of its elements. Such a system generally utilizes a variety of data types, including, for example, imagery, maps, and location based-information, such as retail stores and restaurants.

GIS data systems are now commonly used for a variety of services, including through online and mobile devices. These systems typically enable a user to locate desired information (data) by inputting the geographic region of interest. For example, such systems enable a user to identify real estate listings in a desired geographic area. In some cases, these systems also enable a user to interact with a map to locate data of interest.

GIS data systems should be useful to businesses that are considering expansion, relocation, or entry into new territories by enabling a person to identify appropriate geographic regions. However, existing systems are inadequate in that they do not enable businesses to search for geographical regions using criteria relevant to the particular business and to its plans. As such, these systems are not useful for business formation, expansion or relocation decision-making, in that they do not provide data relating to regional economic growth rates, tax rates, and available state and local incentives, accessibility to transport centers and utilities, nearby technological expertise such as local universities and businesses, together with location demographics, such as cost of living factors, and local income and education levels. Furthermore, existing systems do not enable a user to compare data associated with one prospective region to data associated with another prospective region. Consequently, most businesses rely upon consulting firms, realtors, and site location professionals to compile such data and make recommendations, often based upon limited and incomplete information.

Most state and local governments fund and maintain economic development organizations (EDOs), which serve to promote commercial development and other economic opportunities according to assigned territories. These entities often market their respective locations and services to businesses and people in an inefficient manner. They tend to have overlapping responsibilities with other economic development organizations, including those affiliated with metropolitan statistical areas (MSAs), those run by quasi-governmental agencies, such as utilities, private organizations, such as universities, and private/public partnerships; any or all of these may be funded by local businesses. While all of these organizations focus on local or regional economic development, their inefficient marketing efforts and overlapping responsibilities create confusion for businesses seeking regional and local information, and make it difficult to identify which economic development organizations and that should be contacted. There is currently no central marketplace where economic development organizations can market their respective locations and services, or be searched or compared.

For all of the foregoing reasons, economic development is a field that could benefit substantially from use of an integrated, comprehensive web-based GIS system and service dedicated to economic development. Specifically, entities interested in identifying geographic regions for possible commercial facility development, expansion or relocation would benefit from a central portal where they could research, identify, and compare geographic regions of interest according to a variety of data which is important to them, and identify economic development organizations associated with regions of possible interest. Further, public and private development organizations would benefit from being able to market their services and regions, and provide local data and commentary, through a central marketplace to those entities looking to build or relocate operations.

The present invention is directed to solving this need, by providing online systems and methods that integrate local economic development organization information with a wide array of data, and makes all of this information available through a GIS system. These systems and methods enable users to search, identify and compare locations suitable for their economic development and business needs. The invention enables the user to identify locations of possible interest by searching of GIS data, together with information provided by participating EDOs, and to compare data associated with identified regions for further analysis and consideration. Further, the system enables a user to identify EDOs associated with identified locations, to review statistical data aggregated for those EDOs, as well as information posted by participating EDOs, and to communicate with EDOs in order to obtain further information, such as economic incentives that may be available in the identified or in neighboring regions. All of the foregoing information is associated with a fully-searchable GIS database, and is accessible via an online portal or website.

Conventional geographic information systems have limited usefulness in both their overall functionality and user interface by requiring a user to disambiguate the nature of a search request, selecting search scopes like "address search" or "lot number search" as either an explicit component of the search process or implicitly by allowing only a single scope (most often "address") within which all search requests are interpreted. In contrast, the present invention is directed to GIS systems and methods that enable the user to search multiple data fields or sets to identify geographic regions of possible interest, and to compare identified regions by selecting datasets for comparison. The systems and methods further enable a user to select geographic regions of interest to access the data associated with such regions, and to create search criteria from data associated with a selected region.

The present invention is directed to interactive online GIS systems and methods that provide location specific, detailed, demographic and economic information that can be displayed through a graphic user interface that enables the user to select the dataset to be displayed, and to compare selected data among different locations. Thus, for example, a user could select the display of specific demographic data, or switch to other demographic data, economic data, local transportation data, utility data, or other available data sets, merely by selecting a different tab or button in the user interface.

As can be appreciated, the present invention provides a geographic information system that provides the user with a great degree of flexibility and utility when seeking to research, identify and compare geographic regions for purposes of possible economic development, business expansion and/or relocation. Moreover, the systems and methods provide an ideal platform for economic development organizations to market their respective regions and services, and to initiate communication with entities that may have an interest in such regions.

SUMMARY OF THE INVENTION

The present invention relates to systems and methods for using a geographic information system to research, identify and compare geographic regions for purposes of possible economic development, business expansion, or business relocation. In one aspect of the invention, the systems and methods compile a wide array of data, and format it for use in the GIS system. The data is collected from a variety of public and private sources, and can include data provided by economic development organizations and data obtained from proprietary and local data collection efforts. The types of demographic and economic data made available via the system and methods includes, for example, population data, household data, educational data, financial data, tax data, health data, political data, employment data, weather data, transportation facilities and utility data, cultural and leisure activity data, educational facilities data, and industry-related data. It is reformatted so that it can be populated to a searchable GIS database, and broken down according to preselected GIS regions.

In another aspect of the invention, the systems and methods enable users to search for geographic regions that may be of interest for economic and/or business development opportunities by selecting search parameters from the data that is available. The search function includes searching the GIS data according to a plurality of search fields. Geographic regions that comply with the input search parameters can be displayed on a map and all available data for identified regions can be assessed in an organized fashion in a graphic user interface. These systems and methods further enable a user to select one or more geographic regions to retrieve more complete datasets for the selected regions, and to display comparisons of such regions according to subsets or fields selected by the user. The systems and methods also enable the user or the system to weight and rank the input search parameters, and the locations identified by a search, including using scoring that is dependent on how well locations complied with the input search parameters.

The systems and methods further enable a user to select regions on a map to obtain and display data associated with such regions, and to utilize data associated with a selected region as search criteria for identification of additional regions having similar data. The systems and methods may also be used to display responsive regions on a map and retrieve datasets for neighboring geographic locations merely by selecting such adjoining regions on the map.

In a further aspect of the invention, the systems and methods include information obtained from or posted by economic development organizations. Such information can include more detailed demographic, economic or other data associated with the region covered by the organization, commentary on available data and trends, information on newsworthy events, economic incentives available in the region, and detailed 'profile' information about the organization, along with contact information.

In another aspect of the invention, the systems and methods employ one or more servers connected to a computer network, and one or more data management applications executing in association with the servers to provide a set of search functions, to receive and process search requests, to display responsive results on a map, and to present comprehensive data for a selected region.

In a further aspect of the invention, the systems and methods include a graphic user interface that transforms and displays data in a user friendly format, enabling the user to compare multiple regions by viewing comparative data for such regions side-by-side, using datasets that can be selected via tab or button press functionality. The systems and methods further enable the user to generate, print and save customizable reports using data that is selected by the user.

In yet another embodiment of the invention, the systems and methods provide for networking and communication between users and participating economic development organizations. Within such embodiment, the systems and methods enable third party organizations to post, edit and control information about their regions and services. The systems and methods provide for communication between the user and one or more of these organizations, including through a request for information process in which the user may communicate with and request information from selected organizations, or with organizations associated with specific geographic regions of interest, including on an anonymous basis.

In another embodiment, a computer-readable medium for providing the foregoing functionality is disclosed. Within such embodiment, the computer-readable medium has computer executable instructions, to be executed on a processor, and which include the step of integrating GIS data received from a plurality of sources, storing the data in a searchable database, providing search capability to enable the user to search for regions of interest utilizing a plurality of data points or by selecting regions from a map, identifying the responsive regions, and displaying data for the responsive regions via a graphic user interface that enables the user to select the data to be displayed, and to compare datasets among different regions.

As will be appreciated upon consideration of the following detailed description of the invention and accompanying drawings, there are many advantages and features of the present invention, which in turn lead to many new and useful applications of the invention.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which:

FIGS. 13A-13B are exemplary screen shots of a graphical user interface according to the invention, depicting select data associated with a location.

FIG. 14 is an exemplary window shot generated by a graphical user interface in accordance with the invention depicting comparative data associated with a plurality of locations.

FIGS. 15-20 are exemplary screen shots showing regional information associated with an economic development organization.

DETAILED DESCRIPTION OF THE EXEMPLARY EMBODIMENTS

Figure 1:
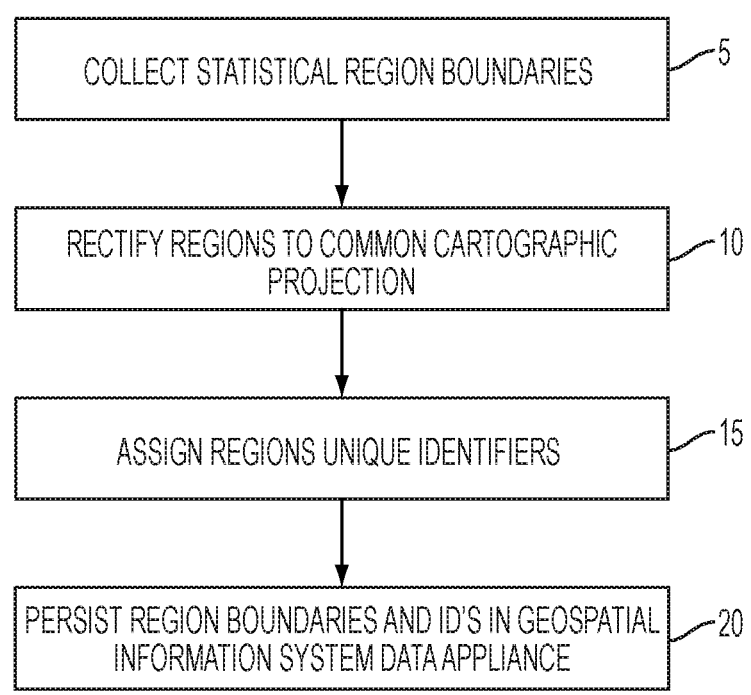
FIG. 1 is an exemplary illustration of a methodology for creating geographic boundaries and associating them with the GIS system and cartographic projections.

The present invention is described below with reference to the illustrative diagrams in accordance with the invention. It is understood that the systems and methods described in each of the diagrams may be implemented by means of analog or digital hardware and computer program instructions. These computer program instructions may be provided to a processor of a general purpose computer, a special purpose computer, or other programmable data processing apparatus, such that the instructions, which execute via the processor of a computer or other programmable data processing apparatus, implement and provide the functions/acts specified in the diagrams and text of this application.

Headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must).

The present invention is directed to GIS-based systems and methods that integrate a wide array of data, which enable users to search, identify and compare locations of possible interest for economic development and other business purposes. Specifically, the invention enables a user to search for locations through use of multiple search parameters selected from available data. As presently contemplated, the data will include demographic data, economic data, transportation hubs, utility services, university and research centers, weather data, sports facilities, cultural facilities, parks, regions of historical significance, and other region specific datasets and information. Regions that meet the selected data criteria will thereafter be displayed on a map. By selecting one or more of the regions identified on the map, the user may view more detailed data about those regions. Where a user already has regions in mind, or has previously searched for regions meeting certain criteria, they may go directly to the relevant data by clicking on a map or entering the location in a search field.

The graphic user interface of the present invention is also important, in that it enables the user to select or change the dataset to be displayed when multiple regions are compared, simply by clicking on a tab or button in the GUI. The interface will then provide the data associated with the selected dataset side-by-side in the display. Further, in the GUI, a user can select the specific data to be displayed. The user can also generate or save a variety of custom reports and charts, such as charts showing trends in a region or across multiple regions.

Another aspect of the invention is that it incorporates data and information about economic development organizations into the searchable datasets. This enables a user to identify EDOs associated with regions of interest. Further, the system enables EDOs to post their own information and data, including, for example, local or regional commentary, current news, upcoming events, local history, cultural information, and economic incentives that may be available to businesses seeking to build or relocate facilities to the identified region. Thus, when comparing regions of interest, a user can identify EDOs associated with the regions, review regional information provided by these organizations, and obtain information about the services provided by the EDOs associated with these regions.

By providing a central location in which EDOs may post their own information, and associating the EDO information with other available data, the invention provides a platform for use by economic development organizations (EDOs) to market their locations and services directly to entities interested in the services and information these organizations seek to provide. The system may also be configured to provide for direct communication between users and EDOs, including means for users to post requests for information (RFIs) to specific EDOs or to all EDOs in a given region.

EDO information pages also enable these organizations to provide comments on data utilized by the system, including trends, errors in data, explanations of data anomalies, and efforts being undertaken by state and local governments to address regional issues. These comments can be presented in EDO profile pages, or via annotations provided by the EDO to data utilized by the system, through a pop-up bubble, link, footnote or the like.

Figure 9:
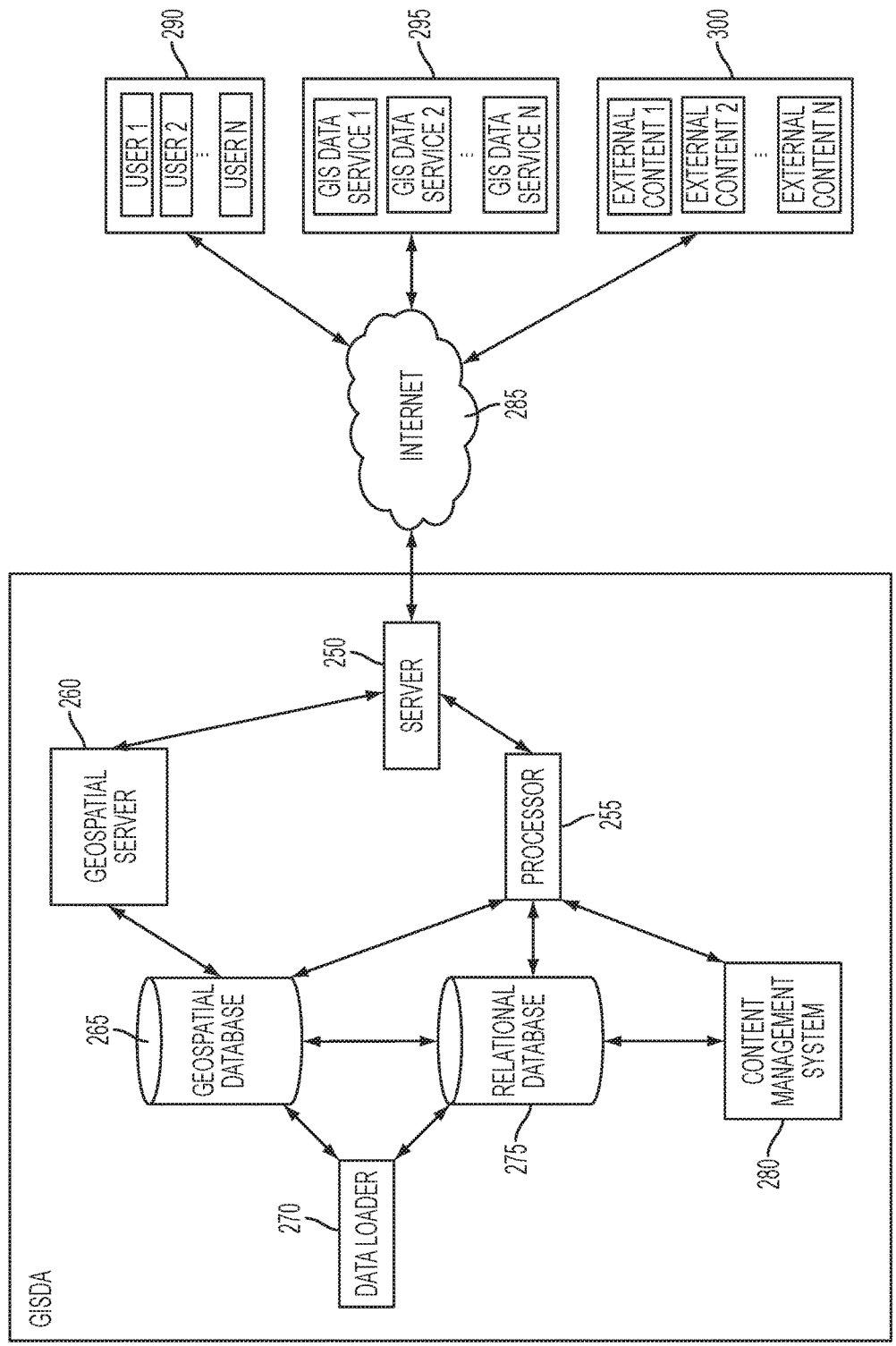
FIG. 9 is a block diagram of a system according to one embodiment of the invention.

Turning to the figures, FIG. 1 is an exemplary illustration of a methodology for creating geographic boundaries and associating them with the GIS system and cartographic projections. This figure illustrates a flow diagram, wherein geographies of predefined statistical regions from various authoritative public domain data sources are imported into a common and comparable format within a geographic information system data appliance ("GISDA"). The data appliance includes a computer system, connected to servers that run different aspects of the system, such as data processing, statistical information and system management, statistical data storage and communications, external communications, and security systems, etc as shown in FIG. 9. The system is also connected to one or more databases and data storage systems and equipment, including back-up systems. However, alternative network configurations are possible, including configurations that include cloud based systems and storage, as will be understood in the art.

According to one embodiment, the system first divides a map into predefined statistical regions of interest. Such revisions may include, for example, census block groups, census tracts, county boundaries, MSA's, Tribal Lands, and State borders obtained from MAF/TIGER spatial data. As shown in FIG. 1, in the first step, denoted with reference numeral 5, the geospatial boundaries of the regions are collected in their native data formats and cartographic projections from public domain web resources, purchased storage media, or standard internet file transfer protocols from public and private sources.

During the second step 10, the various region data sets are re-projected to a common cartographic projection that is chosen for efficient spatial processing and geospatial database storage. Multiple lower resolution simplifications of the regions are computed to facilitate rapid display of regions in situations where fine detail is undesired. In the third step 15, the system collects each instance of these multiple resolution region geometries under an assigned unique identifier for the represented statistical region. In one embodiment, the total number of unique statistical regions for the United States exceeds 8 million and each unique region has up to 6 available spatial resolutions. The result of the fourth step 20 is the persistence of each of the computed region geometries along with a source identifier and unique ID in a common data storage device within the GISDA. The region data within the GISDA is available for topographic and geometric operations for spatial comparison and intersection.

Figure 2:
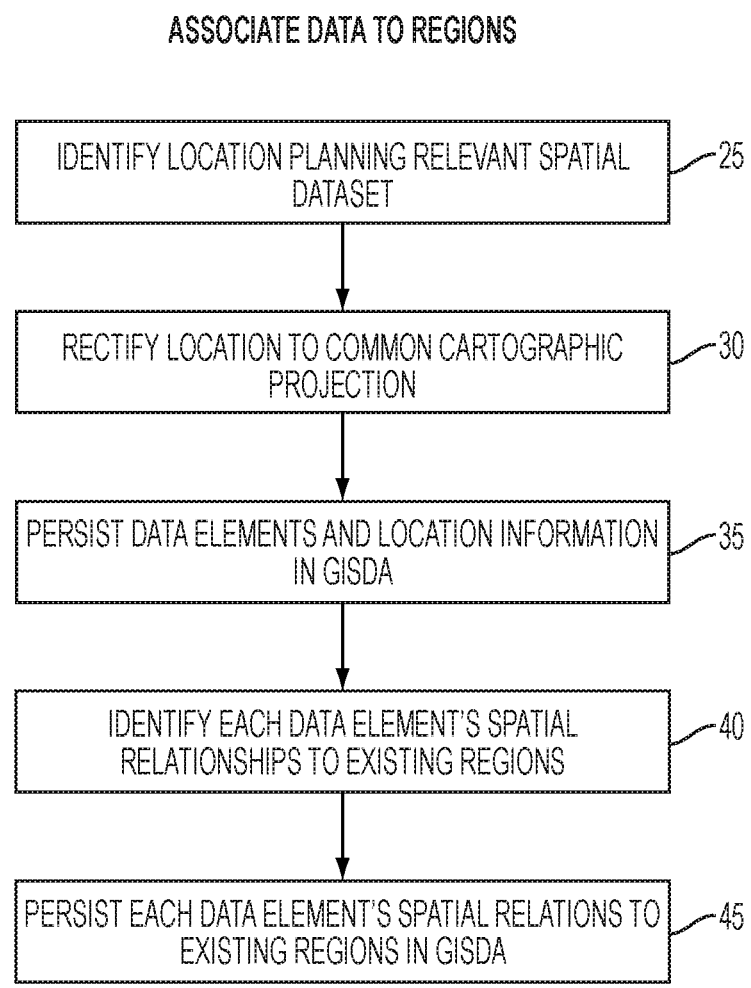
FIG. 2 is an exemplary illustration of a process to identify and collect disparate data sets from various sources and associate them to common statistical regions for the GIS database.

FIG. 2 depicts an exemplary illustration of a process to identify and collect disparate data sets from various sources and associate them to common statistical regions for the GIS database as established in FIG. 1. Data sets can contain multiple parameters (columns) and each entry represents a physical location or collection of locations. This process is repeated for multiple datasets. The first step of FIG. 2 (25) represents the practice of using economists, urban planners, economic development experts, site selectors, and data analysts to identify datasets relevant to strategic location planning and comparison activities. In one embodiment the identified datasets included more than 5000 individual parameters. During the second step 30 an identified dataset is geo-rectified to the same common cartographic projection as the statistical regions established in the process shown in FIG. 1. If the dataset does not contain geographical coordinates but does contain address information, the address is used to geocode the locations' coordinates. Depending on the nature of the data, this step produces points, lines, or polygons for each data entry. At the third step 35 each data parameter in the identified dataset entry is persisted with the calculated geospatial location information in the GISDA. Each entry is uniquely identified and is traceable back to the original data source for attribution. The fourth step 40 takes each data entry and individually compares its spatial geometry to each of the persisted statistical regions established in FIG. 1 to identify the relationships between the two. The spatial relationship between each data entry and every statistical region is classified into the following categories: data entry entirely contains the statistical region; data entry overlaps the statistical region; data entry is entirely contained by the statistical region; the data entry is spatially identical to the statistical region; the data entry is spatially independent of the statistical region. The last step 45 persists the collection of non-independent relationships in the GISDA in a manner that allows the retrieval of every data element from the originally disparate datasets through at least two methods. First, given a region, any or every data entry that has a spatial relationship with the region can be returned along with the nature of the relationship. Second, given a parameter and an associated value range (or a list thereof), each statistical region that is associated with a data entry within the value range can be returned. The process is repeated for each dataset selected for inclusion in the system. Suitable datasets for incorporation into the database include, for example, American Community Survey data, County Business Pattern data, and Occupational Employment statistics. The end result is the unification of the disparate datasets around the unified statistical regions for searching, display, and comparison.

Figure 3:
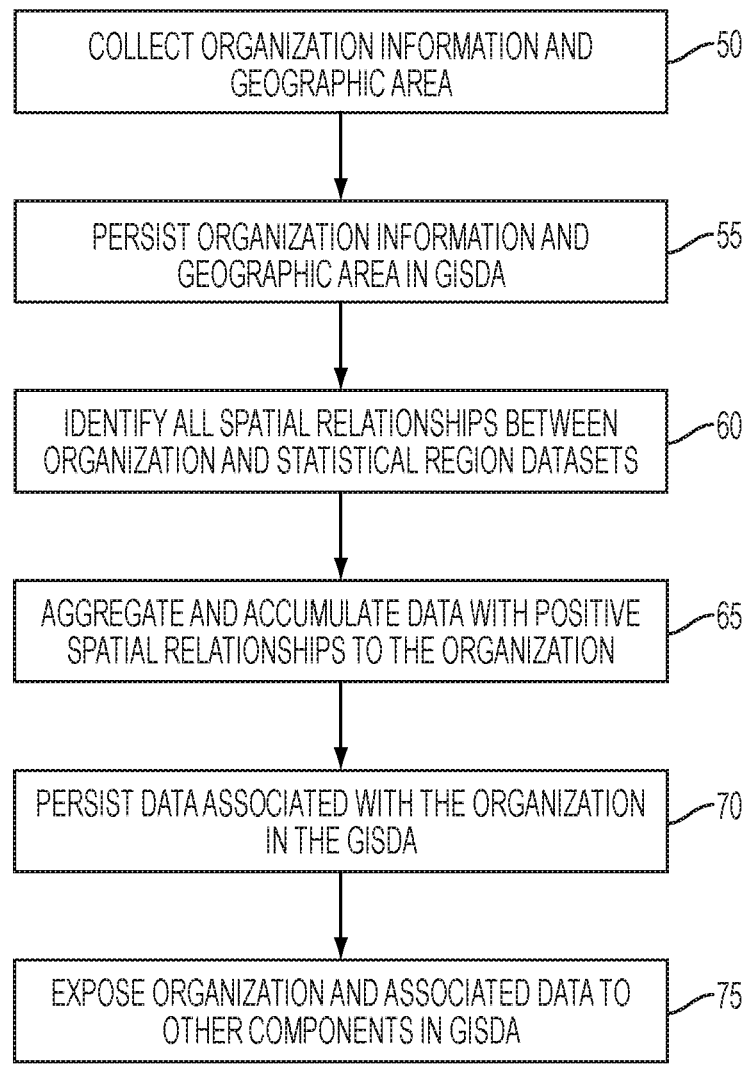
FIG. 3 is an exemplary illustration of a process for aggregating organization-based data to the GIS database.

FIG. 3 is an exemplary illustration of a process for aggregating organization-based data into the GISDA, with all of the data within statistical regions that pertain to the geographic extent of the organization. As shown in this figure, the first step 50 represents the multiple means by which the organization information is collected and input into the GISDA. In one embodiment the GISDA provides mechanisms for bulk importing of organization information from tabular data collected from business intelligence practices along with GUI based forms for individual organization input. The second step 55 takes the organization information and persists it in the GISDA. The minimum requirements for the GISDA to process a new organization are an organization title and a common language description of the geographic area the organization represents. More sophisticated representations of the geography, including GIS file formats, are also acceptable to the GISDA. The end result is a unique record that contains the organization info and the geographic region in a commonly projected and reusable geospatial format that is exposed to other elements within the GISDA.

In the third step 60, the organization system takes the entry and individually compares its spatial geometry to each of the persisted statistical regions established in preparing statistical regions to identify the spatial relationships. The spatial relationship between each data entry and every statistical region is classified into the following categories: organization is spatially identical to the statistical region; organization is spatially identical to a collection of regions; organization contains statistical region(s) but is not identical to their union; organization partially overlaps any statistical region; organization is a spatial subset of the statistical region; organization entry is spatially independent of the statistical region. In the fourth step 65, the system takes the statistical regions that have one of the four positive spatial relationships and associates the data from those regions to the organization. The association takes various forms depending on the nature of the individual data element. For this process, the following categories describe the types of data and their treatment in hierarchical order: (a) Additive—data elements that represent total countable quantities for an individual region that logically can be added to identical elements to give a rolled up value. Total county population is considered a clarifying example of this data type. For example, an organization that encompasses three counties logically claims a total population equal to the sum of those three counties. (b) Normalizable—statistical data elements not considered Additive by themselves but given other data an Additive data element can be constructed. Per-capita crime rate is considered a clarifying example. For example, an organization that encompasses three counties cannot sum or average the three individual rates from the component counties. If both crime counts and population are available for each component county, the region's per capita crime rate can be calculated by summing the three crime counts and dividing by the sum of the populations. (c) Aggregateable—data elements that represent statistical quantities or derived information that do not logically combine given available data. Median age is considered a clarifying example of this data type. Aggregatable data elements are persisted in a one-to-many relationship to the organization.

For example, the organization that encompasses three counties would require the complete age distribution of the three component counties to recompute the median age for the region. In the absence of this data, median age is considered only aggregatable and the region must report the median ages of each component county.

The scenarios below represent the combinations of spatial relationships with data types and the association actions taken.

---

1. Organization is spatially identical to the statistical region
    a. Data elements for that statistical region are directly associated to the organization.
2. Organization is spatially identical to a collection of regions and all regions have the data element
    a. Data elements are combined following the data treatment hierarchy.
3. Organization is spatially identical to a collection of regions but all regions do not have the data element
    a. Data elements are demoted to Aggregatable and missing data is noted.
4. Organization only contains statistical region(s) but is not identical to their union
    a. Data elements are demoted to Aggregatable and partial spatial coverage is noted.
5. Organization partially overlaps any statistical region
    a. Data elements are demoted to Aggregatable and overlapping spatial coverage is noted.
6. Organization is a spatial subset of the statistical region
    a. Data elements for that statistical region are directly associated to the organization and spatial subset is noted.

---

At the fifth step 70, the system persists the organization-based data values computed for the organization's spatial extent. When new data sets are added to the GISDA, the "Associate Data to Regions" and "Organization Based Data Aggregation" processes are available to assimilate the new data elements into this structure. The final step 7 creates the service interfaces to expose the organization and the computed data to other elements in the GISDA.

Figure 4:
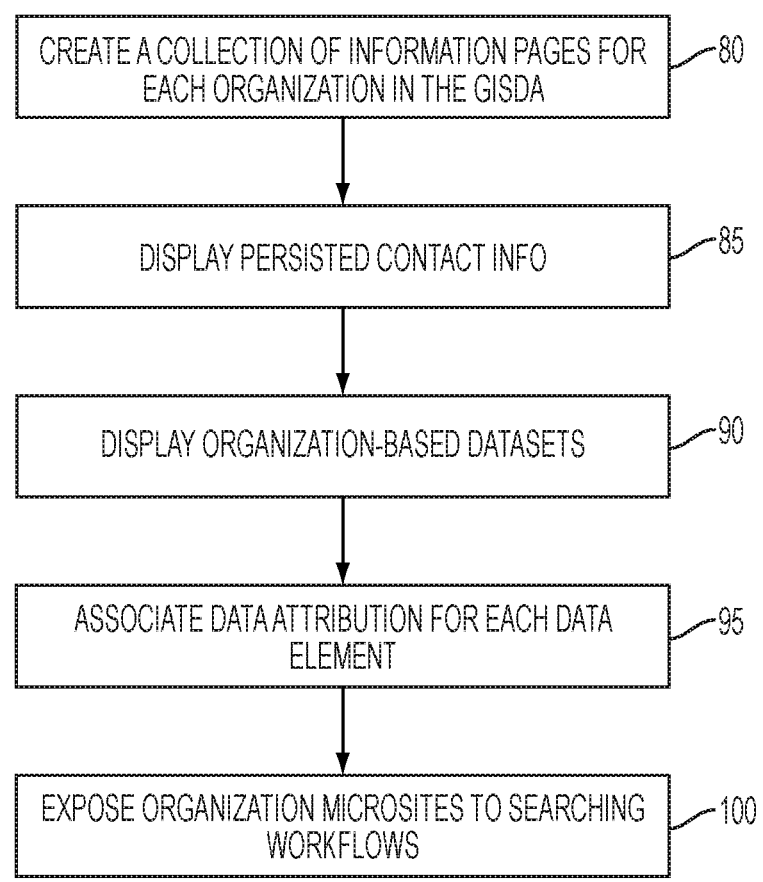
FIG. 4 is an exemplary illustration of a process for creating, associating and persisting organization information and data within the systems and methods of the invention.

FIG. 4 depicts an exemplary illustration of a process for creating, associating and persisting organization information and commentary within the system. Here, organization information and commentary is created and incorporated into the GISDA as shown in the figure. The first step 80 uses various templates to create a unique collection of information pages for each organization. The pages display data and contain mapping elements that give data driven overviews of the organization's region. The sites may be given unique url's and become stand-alone representations of the organization that may be referred to as a page or a microsite. The page or microsite contains elements that may be customized by each organization, as described below.

The second step 85 uses the persisted organization contact info from the GISDA to populate the template and prominently display the organization associated with the microsite. The third step 90 uses the organization-based datasets persisted in the GISDA to populate the template with certain data associated with the organization. The datasets may be organized by topic, rather than by source. The Additive, Normalizable, and Aggregatable elements are displayed in a manner that conveys the process used to associate the data to the organization. The fourth step 95 displays the data attribution persisted in the GISDA for each data element. The fifth step 100 exposes the organization microsites to other elements of the GISDA for inclusion in various search workflows.

Figure 5:
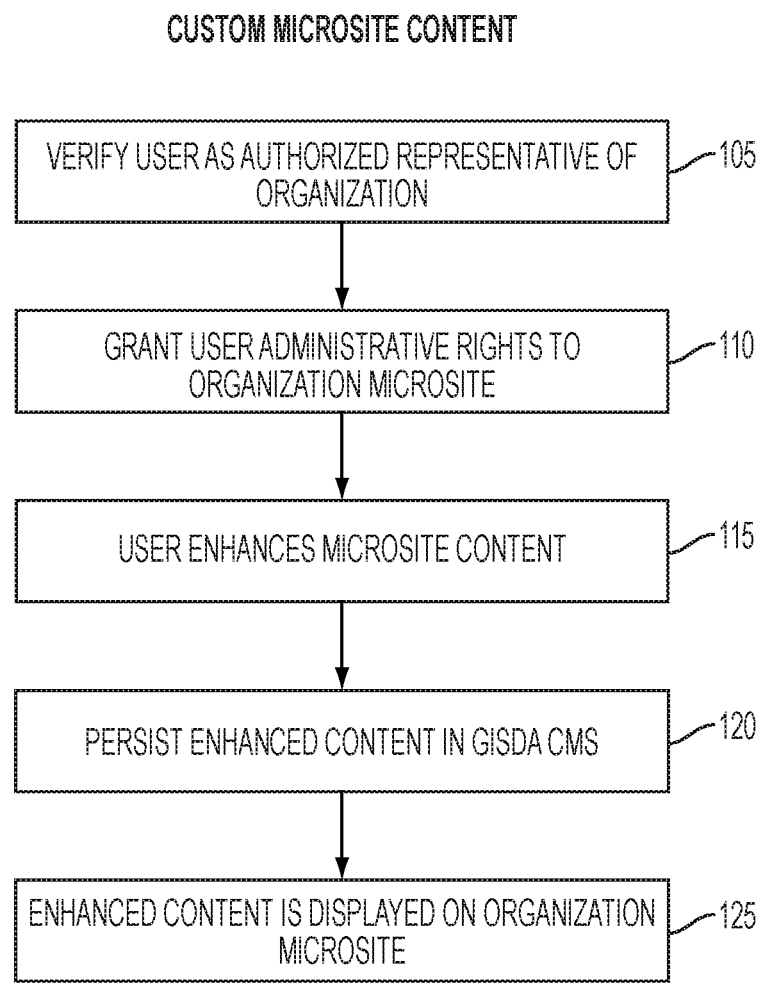
FIG. 5 is an exemplary illustration of a process whereby organizations can provide customized content that can be displayed in the systems and methods of the invention.

FIG. 5 depicts an exemplary illustration of a process whereby organizations can create and add customized content to their microsite. As an initial step 105, a user associated with an organization must be verified to confirm that the user is an authorized representative of an organization, such as an EDO. The system then grants the authorized user administrative rights to pages within the system associated with that particular organization as shown at 110. The authorized user is then able to enhance the pages with further information and content chosen by that organization as shown at 115. The newly added information is then persisted as enhanced content in the GISDA CMS as shown at 120. Finally, the enhanced content is displayed to those users that browse on the organization's pages or microsite as shown at 125.

Figure 6:
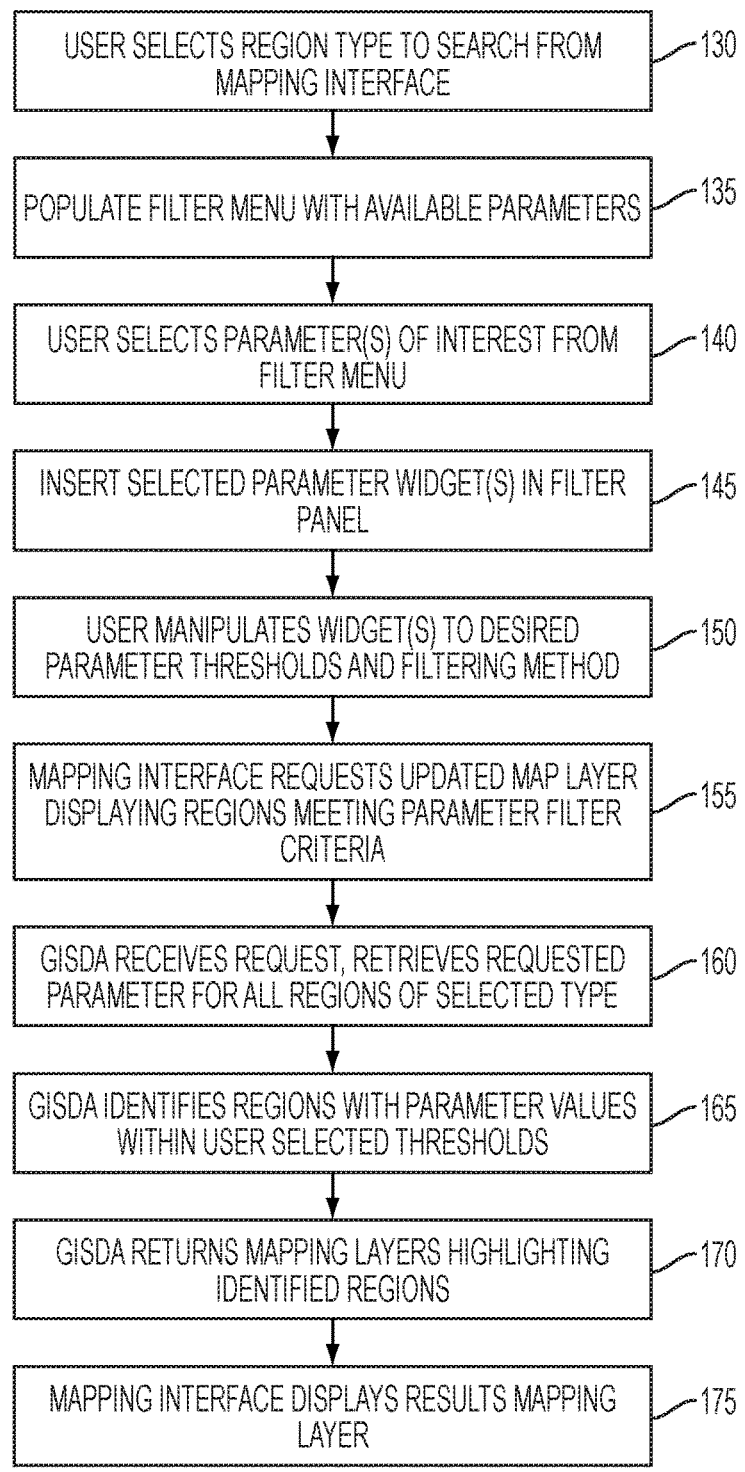
FIG. 6 is an exemplary illustration of a process through which the systems and methods enable a user to search for geographic regions of interest, with the search results being displayed on a map.

FIG. 6 is an exemplary illustration of a process through which the invention enables a user to search for regions by selecting a region type, and selecting data parameters available for the selected type of region. This represents the process by which any number of GISDA datasets can be employed to filter, rank, and identify statistical regions using a mapping interface provided by the GISDA and made available to users on remote computing devices. The first step 130 represents a user of the GISDA interacting with a user interface that is networked to the GISDA and which allows the user to select a region type to search from the mapping interface. Programmed regions may include, for example, State, County, MSA, and EDO census tract and block. The system may be configured to permit a user to access the geographical information system interactive mapping system and associated data and weighting widgets with or without an account. For example, the system may permit registered users to have access to all data and search capabilities, while limiting unregistered users to only select data sets or limited filtering options. Further restrictions on unregistered users could include, for example, permitting only certain data layers to be viewed on a map, or limiting comparative data viewing in the graphical user interface.

Upon selection of region type(s), the search interface requests the available search parameters from the GISDA. The GISDA responds with a structured list of available parameters for the selected region type(s). During the second step 135, the filter menu of the GISDA is populated with available parameters for the selected region (e.g. coastal, mountain, north-east, red states, blue states, etc.). The parameters may be arranged by topic, rather than source. The end result is a menu that allows the selection of any number of filters for searching. At the third step 140, the user selects parameter(s) of interest from the filter menu. During the fourth step 145, the user inserts selected parameter criteria in the filter panel. These criteria provide the filter panel with access to combined multi-parameter analysis using thresholds, ranking, and scoring algorithms available in the GISDA. As will be appreciated to persons skilled in the art, the filter panel could be configured to accommodate a variety of tools and criteria, including, for example, widgets, slider bar, drop down entries and other pick-lists, input numbers or numerical ranges, and the like.

During the fifth step 150, the user manipulates the criteria to the desired parameter thresholds. At the sixth step 155, the mapping interface requests the updated map layer displaying regions meeting the selected parameter filter criteria. At the seventh step 160, the GISDA receives the request and retrieves the requested parameters for all regions of the selected type. If ranking or scoring methods are specified for the search, they are calculated by the GISDA at this time. Next, the GISDA identifies regions with parameter values within the user selected thresholds as shown at 165. At the ninth step 170, the GISDA returns mapping layers to identify regions meeting the selected parameters. Finally, at the last step 175, the mapping interface displays results on the mapping layer. As will be appreciated, the system can in the alternative be configured to also identify regions that satisfy less than all of the specified search parameters. For example, the system can be configured to display regions that satisfy a minimum of "x" number of search parameters, or regions that are within a certain percent of numerical ranges that are used as search parameters. If so configured, these regions could be displayed on the map using different colors or shading to denote that they are close to but outside of the search parameters. The system may also include a tool that allows a user to adjust the threshold for including regions outside the specified search parameters.

Figure 7:
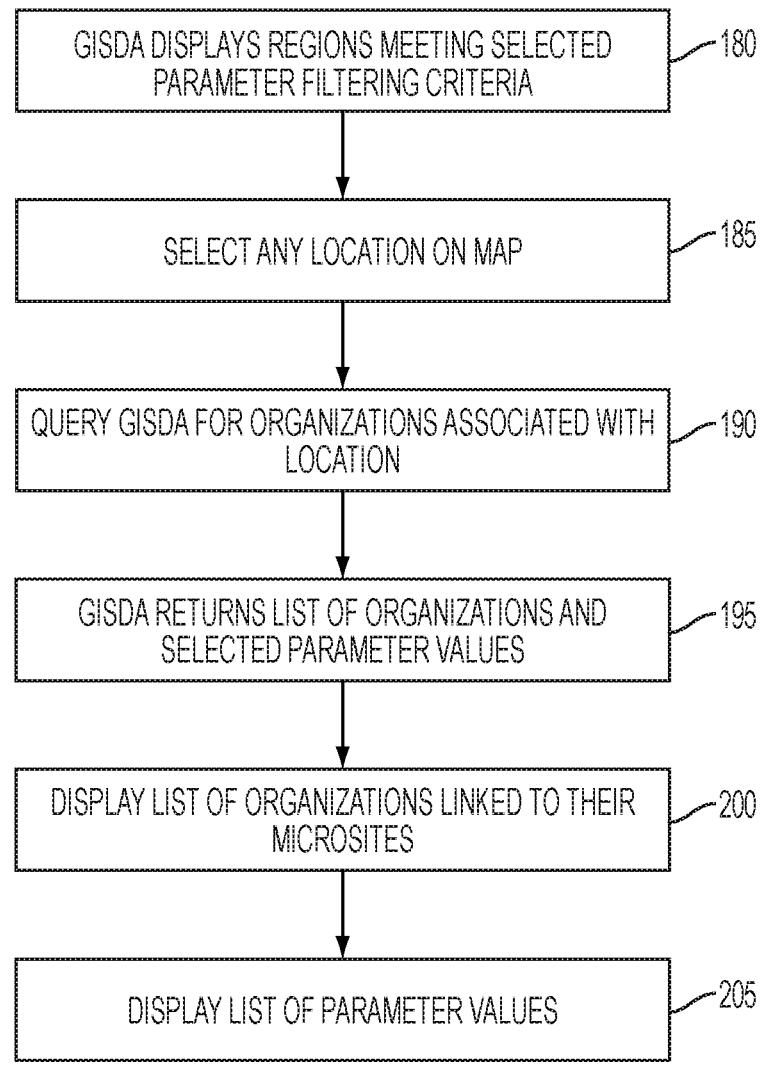
FIG. 7 is an exemplary illustration of a process through which the systems and methods identify organizations associated with selected map locations.

The GIS processing unit also preferably performs the function of generating a search-specific electronic summary. In one preferred embodiment, a search-specific electronic summary may include the input data parameters. In another embodiment, the electronic summary may the selected data parameters from the mapping interface. These parameters of interest serve as a template for a comparison report summary page. The user selects regions of interest in various locations in the system including microsites, mapping interface, and keyword search results. In the comparison report page, the parameters from the template are displayed for each the regions of interest in a format that lends itself to quick comparison across the regions. This summary comparison page provides navigation paths to multiple report pages that display similarly formatted comparisons of all available data parameters for the selected regions of interest. In these extensive data comparison pages, users may choose to promote any data parameter to the summary page. This functionality that adds parameters to comparison summary is duplicated in other areas of data presentation including organization pages or microsites and map searches. These electronic comparison summaries and detailed views are also available for download in document and spreadsheet formats. The templates may also be persisted so that they can be recalled, modified, and applied to other regions of interest FIG. 7 is an illustration of a process through which the systems and methods identify organizations associated with map locations. As an initial step 180, the GISDA displays regions that meet user selected filtering criteria. Next, the user selects a location displayed on the map 185, whereupon, the GISDA is queried for organizations, such as EDOs, associated with the selected location 190. The GISDA then returns a list of organizations associated with the location that meet the selected filtering values 195, with links to each organization's microsite within the system 200. In the preferred embodiment, the associated list of organizations will be displayed along with a list of the selected parameter (filter) values 205.

Figure 8:
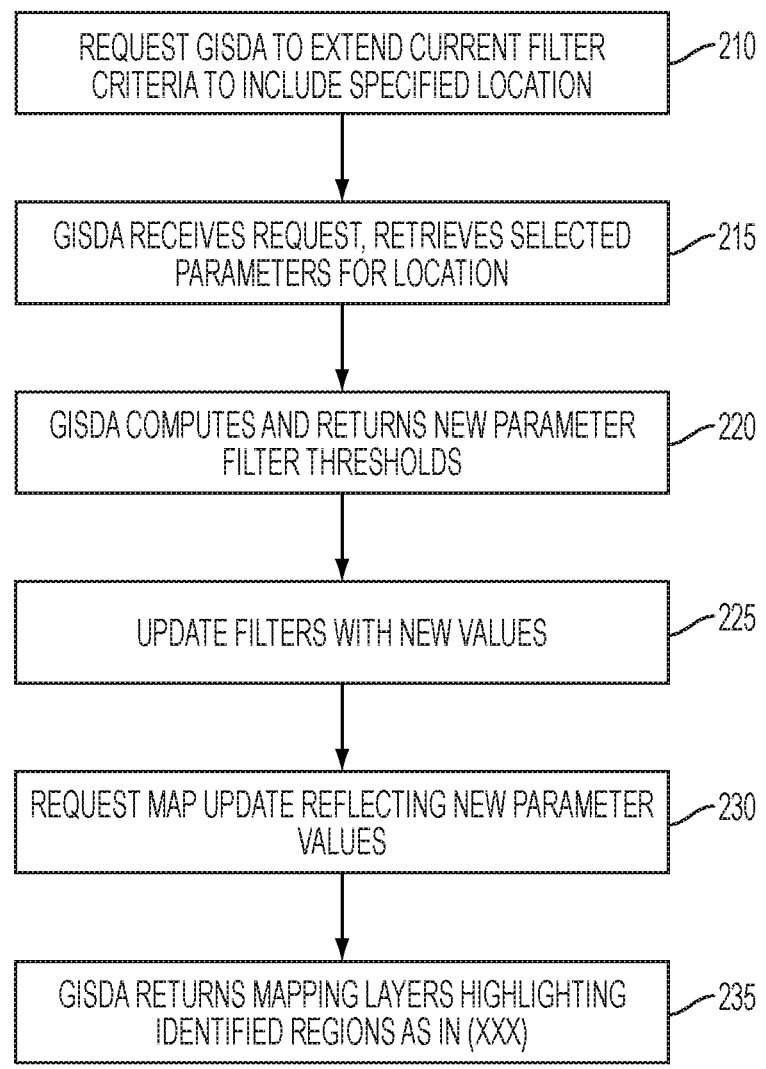
FIG. 8 is an exemplary illustration of a process through which the systems and methods search for geographic regions using filter criteria obtained from a location selected by the user.

As shown in FIG. 8, the system also includes mechanisms for altering the filtering criteria to correspond to data associated with a region selected by a user. For this functionality, the user would typically select multiple filter criteria and then query a region of interest that did not meet the filter criteria. Upon reviewing the values of the parameters for the selected filters, the user could choose to extend the filtering widgets to settings that would include the region of interest as shown at 210. The GISDA receives the request and retrieves parameters encompassing the selected region of interest as shown at 215, and computes and returns a new set of parameter filter thresholds based on the specified location as shown at 220. The filters are then updated with these new parameter values as shown at 225, and the system requests a map update that reflects the new parameter values as shown at 230. Finally, as shown at 235, the GISDA returns mapping layers highlighting new identified regions responsive to the new search parameter values. The user then sees the all the regions that meet the extended filter criteria the region of interest that dictated the degree of extension.

FIG. 9 depicts a block diagram of the GISDA and components utilized in compiling data and building the database used by the GISDA. Data loader 270 includes components that enable the ingestion, categorizing, simplifying, and representation of geospatial data. Upon completion of these and other processes, the data loader 270 persists the spatial data in geospatial database 265. The data loader 270 also includes multiple components that ingest both statistical data from authoritative sources and organizational data gathered from organizations and business intelligence sources. The data loader 270 uses the geospatial database 265, geocoding, and spatial techniques to determine each data element's relation to existing regions and persists the needed information in relational database 275. The content management system 280 uses the relational database 275 to store and retrieve organization generated content that may be displayed on individual organization pages or microsites. Processor 255 retrieves data from the databases and the content management system 280 to generate displays and user interfaces for functions including display or organization information and microsites, regional comparisons, reports, dashboards, and search parameters and tools. Processor 255 also includes components that receive requests for locations filtered using the user's selected search parameters and determines which regions are responsive to the specific request. Geospatial server 260 renders maps of the regions returned by the processor in response to a specific user query. Server 250 provides the public facing interface and securely routes requests to the appropriate internal GISDA components. Server 250 is connected via the Internet 285 to multiple users 290, to a plurality of GIS data suppliers and services 295, and to external content sources 300.

Figure 10A:
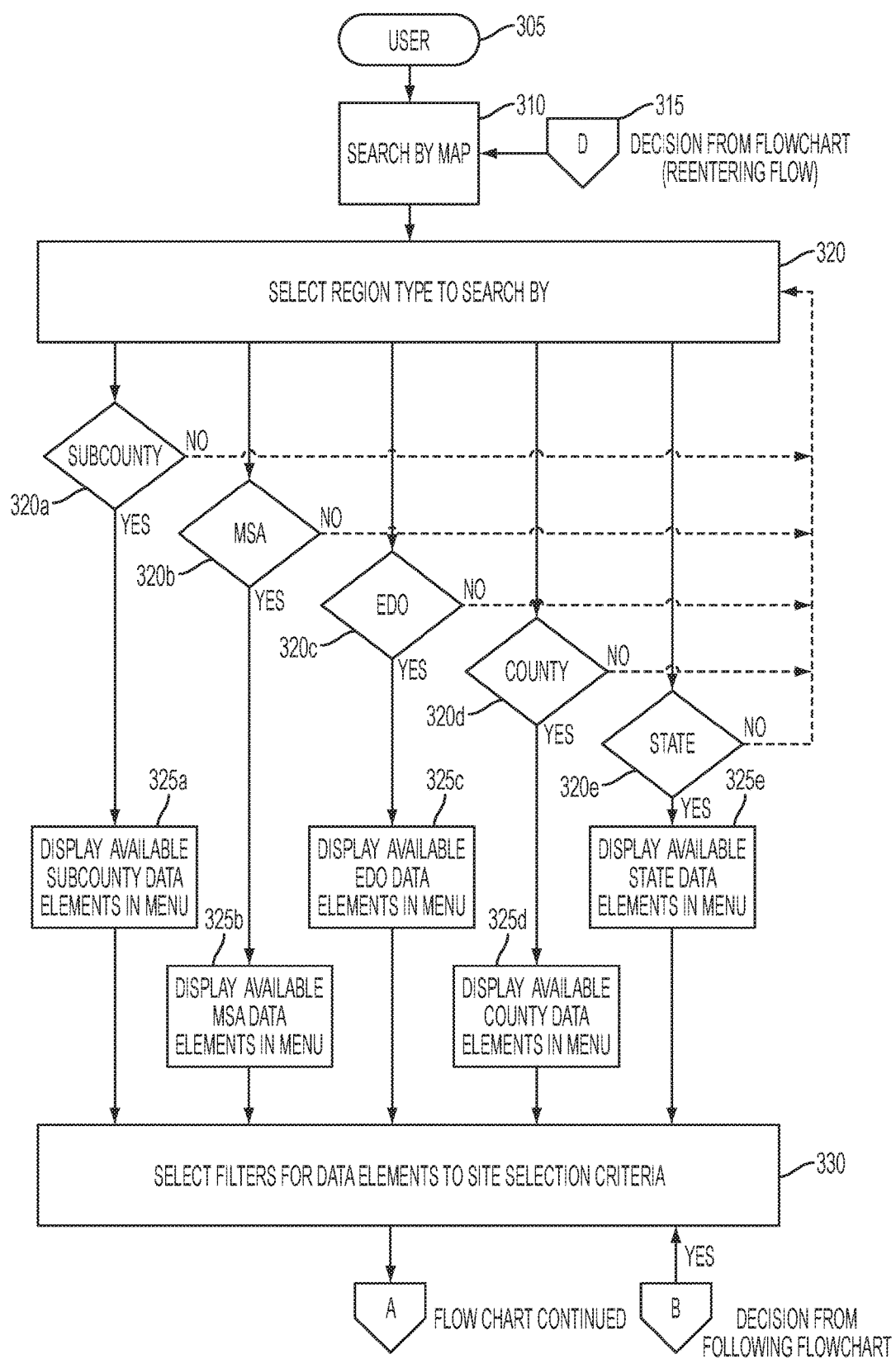
FIGS. 10A-10C comprise a flow chart depicting a process according to the invention for searching for regions of possible interest, identifying economic development organizations associated with such regions, reviewing data associated with the region and EDOs associated therewith.
Figure 10B:
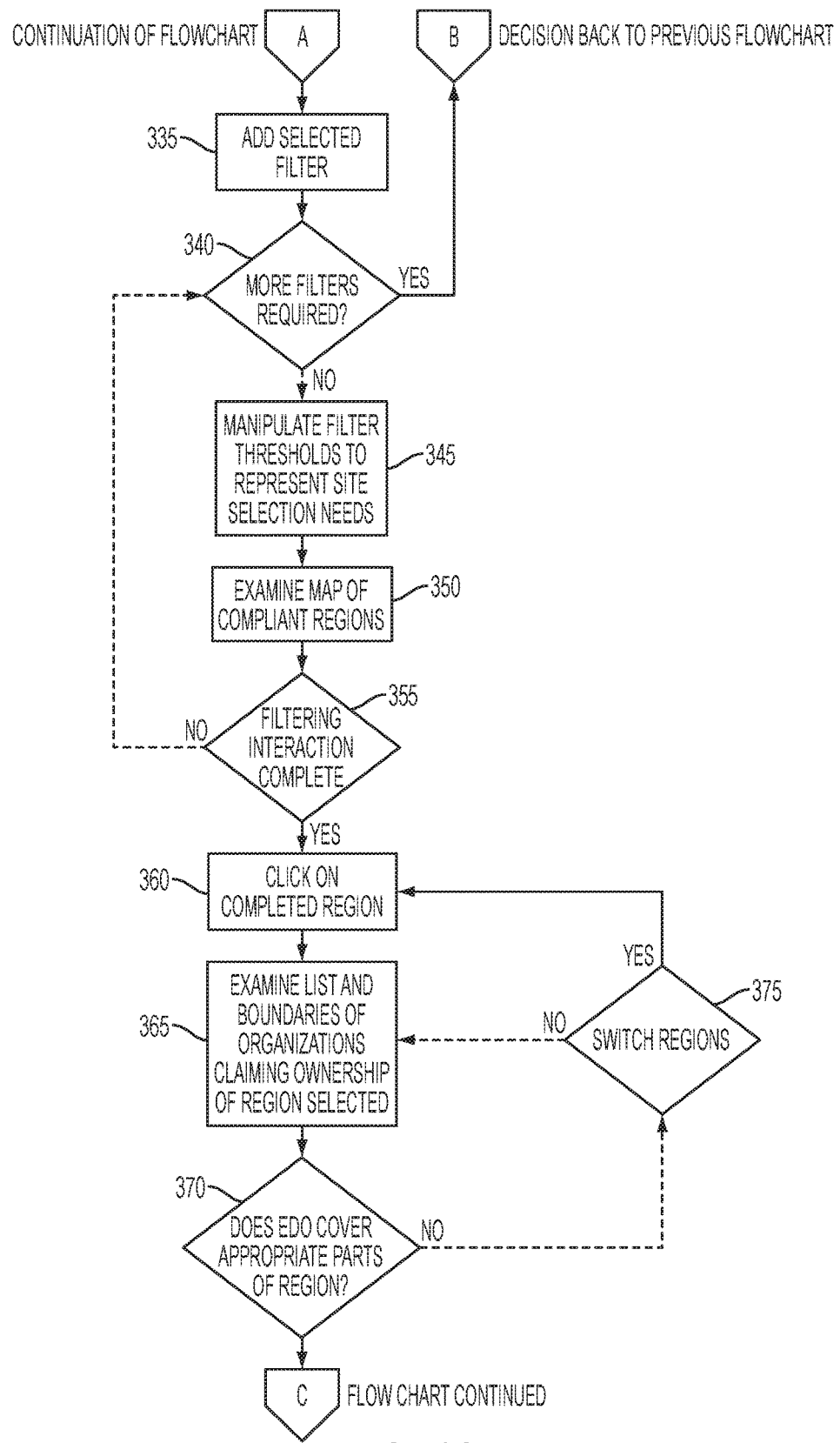
Figure 10C:
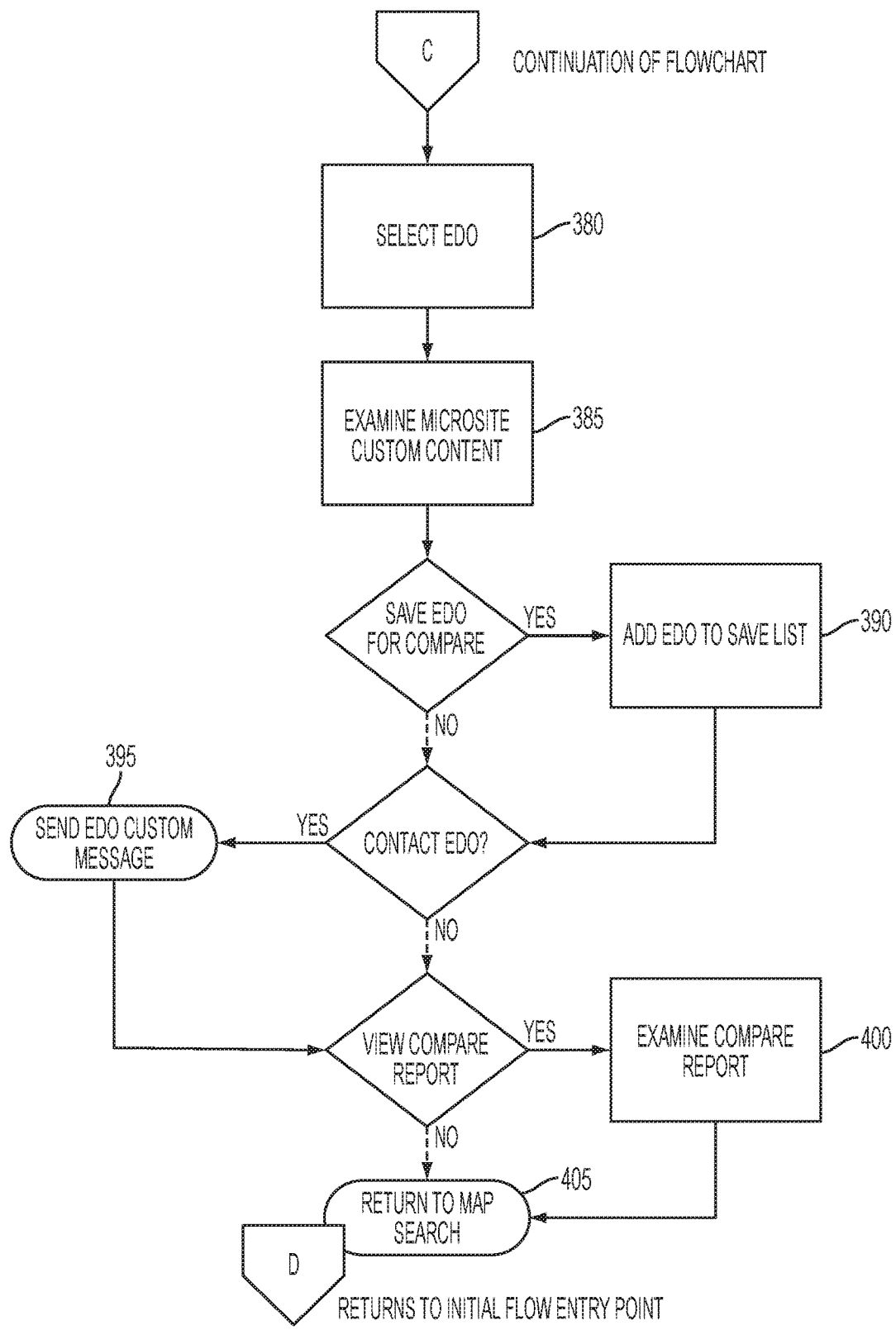

FIGS. 10A-10C comprise a flow chart depicting a process for searching for regions of possible interest, identifying economic development organizations associated with such regions, reviewing data associated with the region and EDOs associated therewith. A user 305 may elect to search for locations to be identified on the map 310. First, the user may select to search via region type 320. As shown in this figure, this embodiment includes region types: Subcounty 320a, MSA 320b, EDO 320c, County 320d, and State 320e. As will be appreciated in the art, the region type could include alternate regions, as long as the data is persisted to such regions. The system next displays the data elements available for the selected data type 325a, 325b, 325c, 325d, 325e. Next, a user selects filter parameters 330, 335, 340 to be used for searching from the available displayed data elements. Once the filter parameters are selected, the user manipulates the data thresholds 345 for the selected filter parameters. The GISDA thereafter uses the parameters to construct a search, and displays the search results on a map. As the next step, the user can review the search results on the map 350 and determine if the responsive, compliant regions are suitable for the search. If so, the filtering is complete. The search results are inadequate (too few responsive regions) or inappropriately numerous (too many responsive regions), the user may go back and change the filers and thresholds as needed 355. Once the searching is complete, the user may select a responsive region for detailed analysis 360. The user may, for example, obtain a list of EDOs associated with a selected region and determine the boundaries of each identified organization 365. If the boundaries are not appropriate for the region desired by the user 370, the user may select a different EDO associated with the region or a different region responsive to the search 375. Once the user locates an EDO of interest that covers the desired region, the EDO may be selected to access content associated with that EDO 385. The user may thereafter save the EDO information to a save list 390, contact the EDO 395, or begin the process to run a comparison between the selected region or selected EDO and another region or another EDO 400. The user may also return to the map search, to view another responsive region, to modify the search parameters, or to conduct another search 405.

Figure 11:
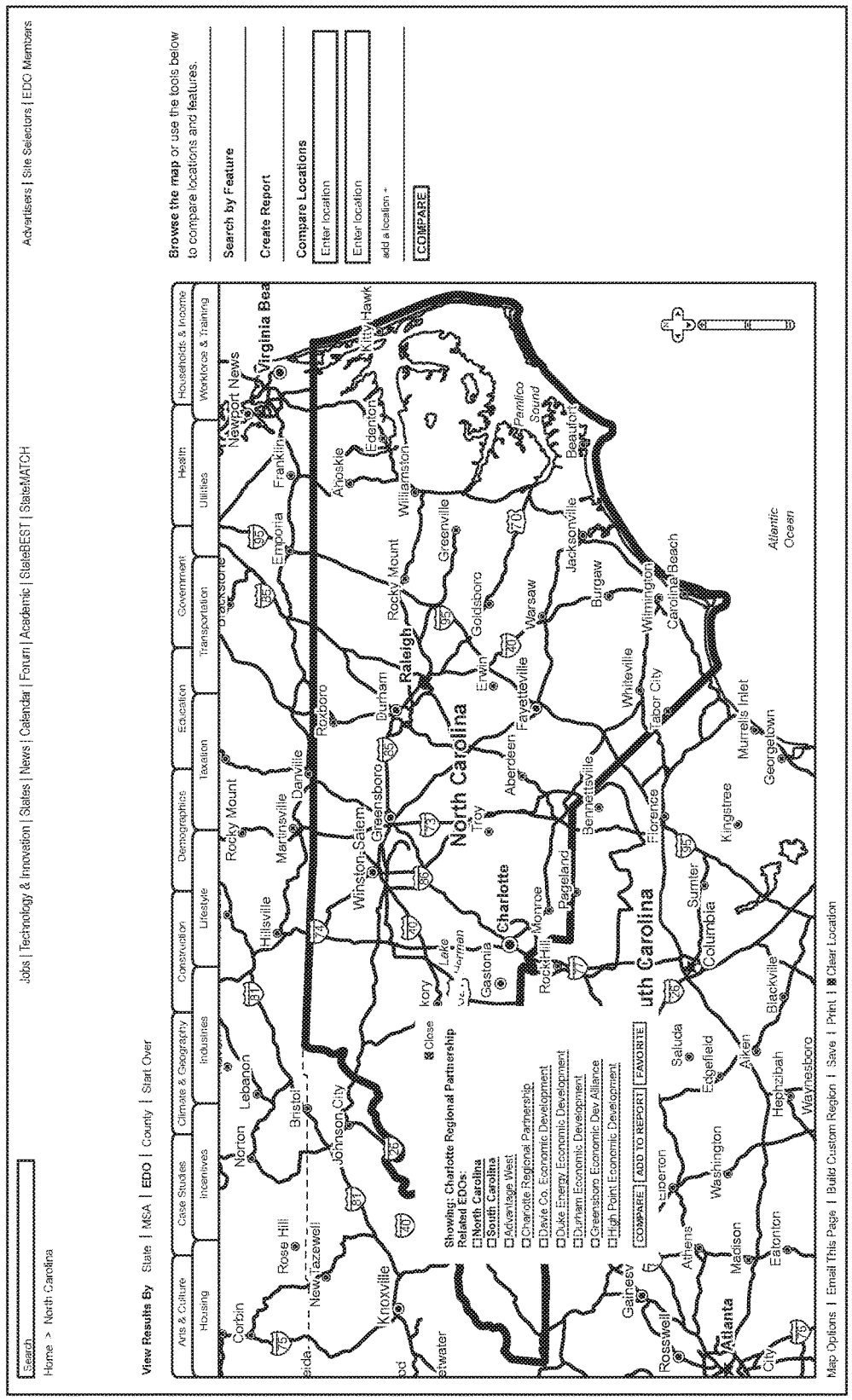
FIG. 11 is an exemplary screen shot depicting a region selected by a user, and showing economic development organizations associated with the selected region.

FIG. 11 depicts a screen shot showing a region (North Carolina), wherein an MSA (Charlotte region) has been selected. The selected region is highlighted on the map. In this figure, a list of EDOs associated with the selected MSA is displayed by the GISDA as a call-out to the highlighted geographic region. From this display, the user may select an EDO from the list to access information or a microsite for the selected EDO. The user is further given the option, in the call-out, of comparing the different organizations, adding the list of organizations to a report, or marking the region as a "favorite" for future reference. The user may also select other datasets for the selected region by selecting from the available "tabs" shown across the page. On this page, the datasets include Arts & Culture, Case Studies, Climate and Geography, Construction, Demographics, Education, Government, Health, Households and Income, Housing, Incentives, Industries, Lifestyle, Taxation, Transportation, Utilities, and Workforce and Training. In the right hand column, the user could also select "Compare Locations" to compare the selected location to another location, and "Create Report" to create a report for the selected region or multiple regions.

Figure 12A:
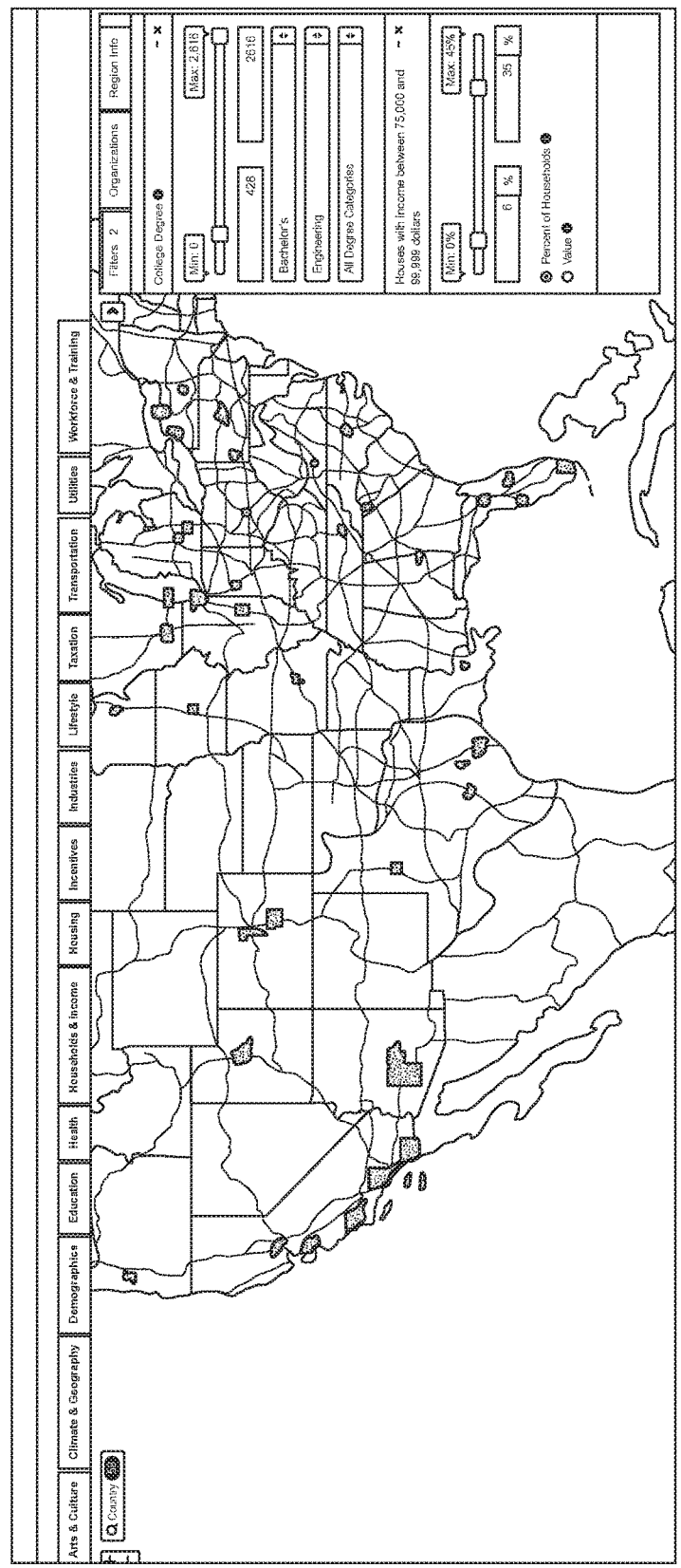
FIGS. 12A-12C are exemplary screen shots depicting search results generated by the disclosed systems and methods, and data associated with a selected region.
Figure 12B:
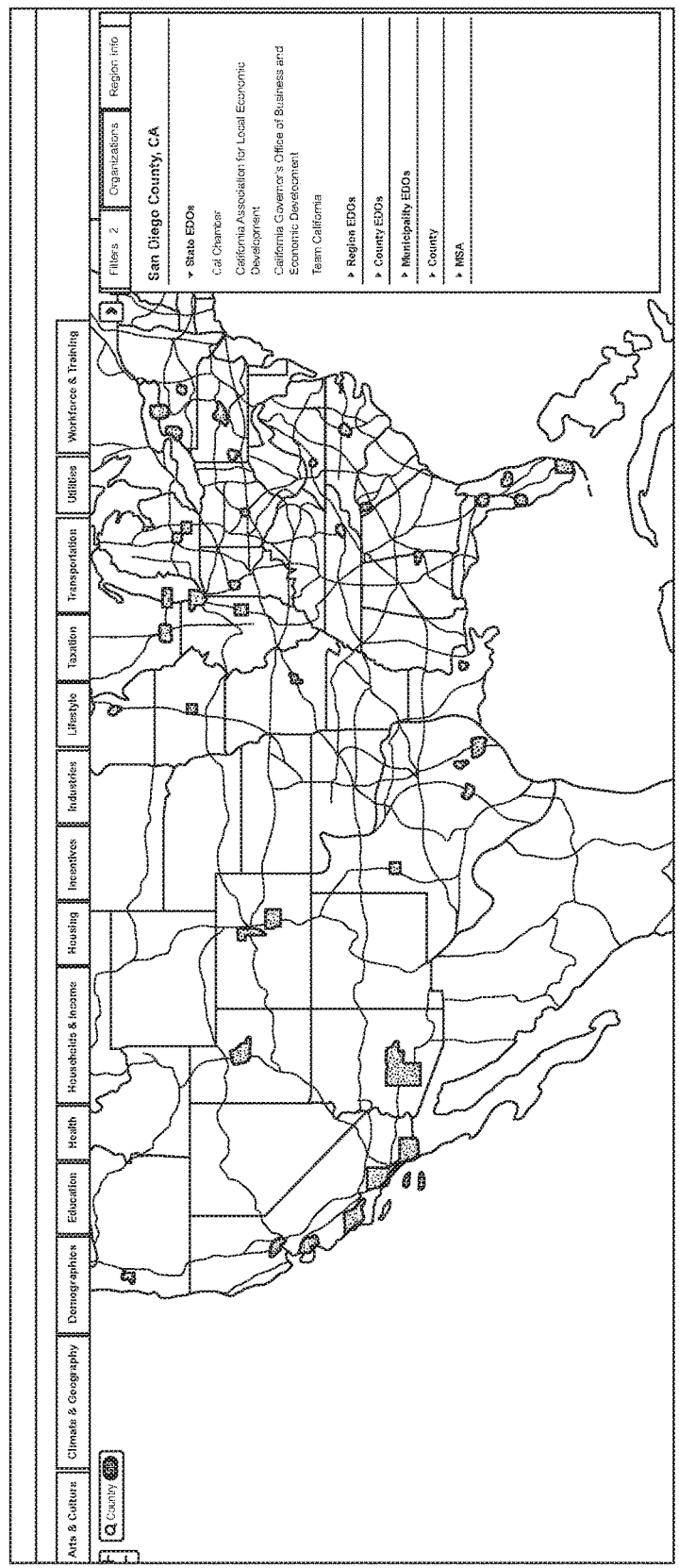
Figure 12C:
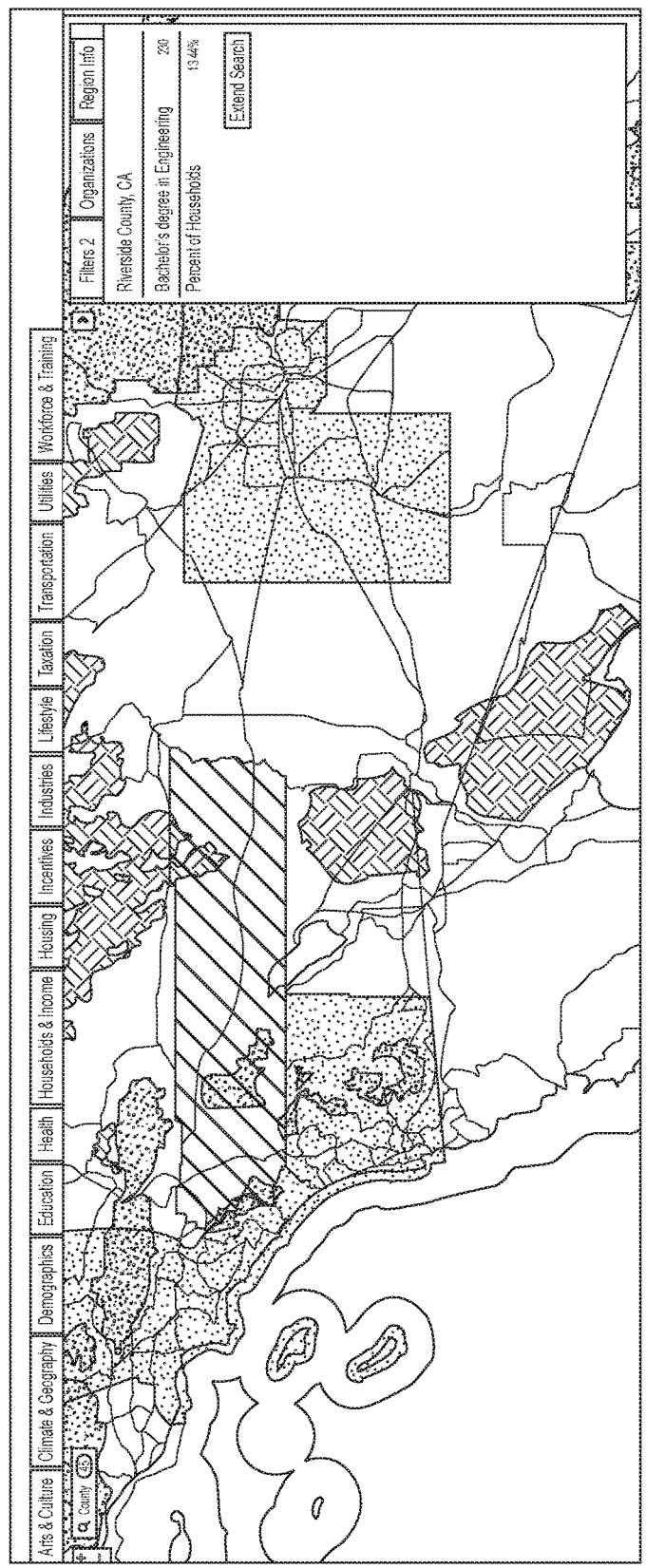

FIG. 12A is a screen shot depicting search criteria and GISDA search results displayed on a map. The search results include San Diego, Calif. From FIG. 12A, the user may change the search criteria in the right hand column to conduct further searching. In response, the GISDA will display the revised criteria and the regions that are responsive to the new search. In the alternative, the user may select a displayed region to view datasets available for the selected region. FIG. 12B is a screen shot wherein the user has selected the San Diego, Calif. region from the search results map of FIG. 12A. From FIG. 12B, the user may view Organizations associated with the selected region, including in this case State EDOs, Region EDOs, County EDOs, Municipality EDOs, County organizations and MSA organizations. Further, the user may select the Region Info tab, to view regional data and information, as depicted in FIG. 12C. In each of FIGS. 12A, 12B and 12C, the user can add the search results and depicted data to a report. The user may also go back and alter the original search criteria to identify or select additional regions for review.

Figure 13A:
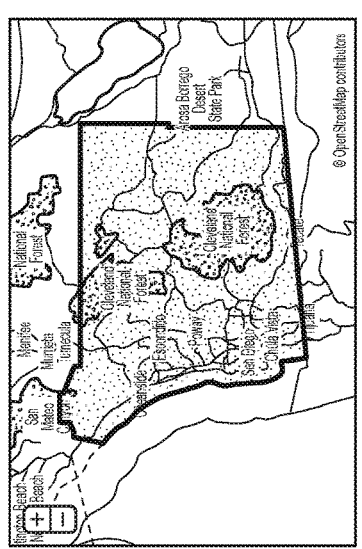
Figure 13B:
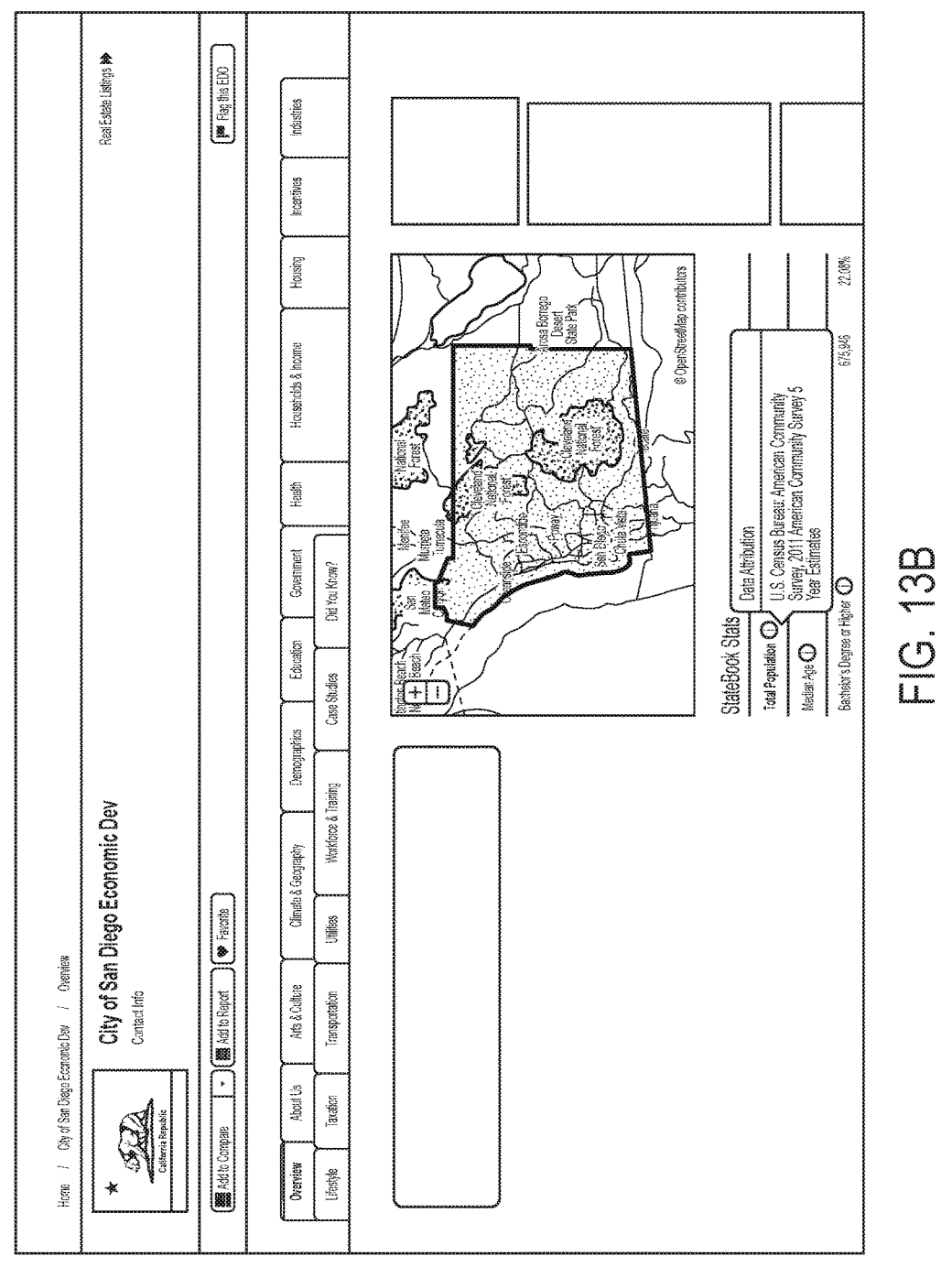
Figure 15:

FIG. 13A is a screen shot depicting data associated with a region selected by a user. From this display, the user may change the dataset to be viewed for the selected region by toggling the tabs near the top of the page. In response, the GISDA will display the corresponding dataset. Also, the user may save the displayed data to a report or compare the data to corresponding data associated with another region. Further, for certain datasets, the user may select the data to drill down for further information, including the source of the data, as shown in FIG. 13B. The user may also copy the data for pasting into another document, and may select a button to create a graph of the depicted data, for example, showing how the data has changed over time, if the data is available. FIGS. 13A and 13B highlight the user-friendly nature of the graphical user interface, as different datasets for the region may be selected by toggling on the tabs near the center of the page. In these figures, the "Overview" tab has been selected. However, the system includes available data in each of the other tab categories, making it easy for a user to find the data that is desired, and compare the data for one region of interest to another region of interest. Further, the system can permit a user to program specific tabs as a preset "preference" view, or to set a plurality of selectable preference views so that only the data categories associated with such views is displayed.

Figure 14:
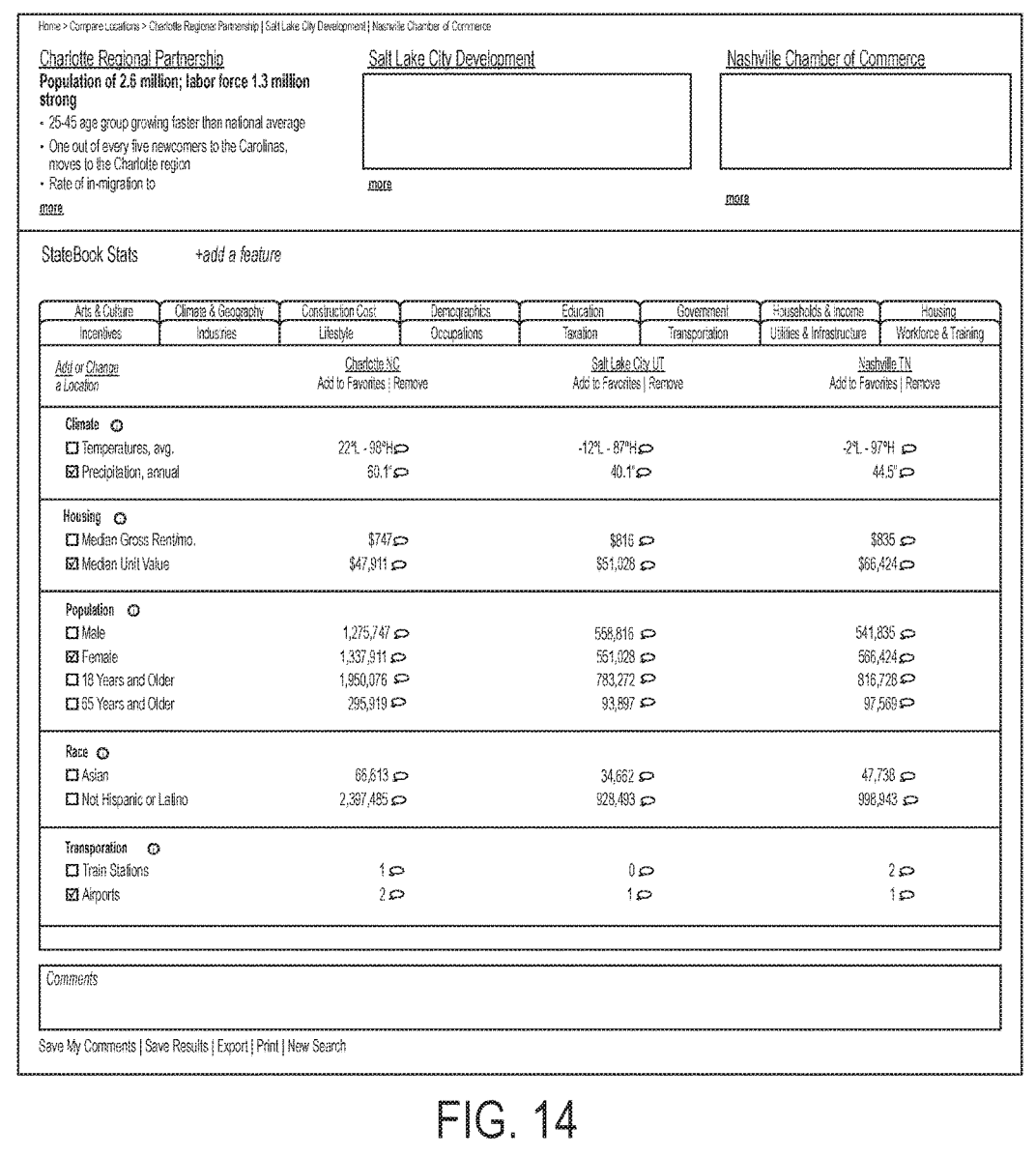

FIG. 14 depicts a screen shot of a comparison of selected data for three regions: Charlotte N.C., Salt Lake City Utah and Nashville Tenn. This screen shot shows the data associated with the search parameters selected by the user. From this screen, the user may select specific data for inclusion in a report by checking a box for the data to be included. The user can also change the displayed dataset, and select additional data to be included in the report, by toggling the dataset tabs. For example, this screen shot depicts the following datasets: Arts & Culture, Climate and Geography, Construction Costs, Demographics, Education, Government, Households and Income, Housing, Incentives, Industries, Lifestyle, Occupations, Taxation, Transportation, Utilities and Infrastructure, and Workforce and Training. The user can also add or delete one or more regions from the comparison list.

Figure 16:
Figure 17:
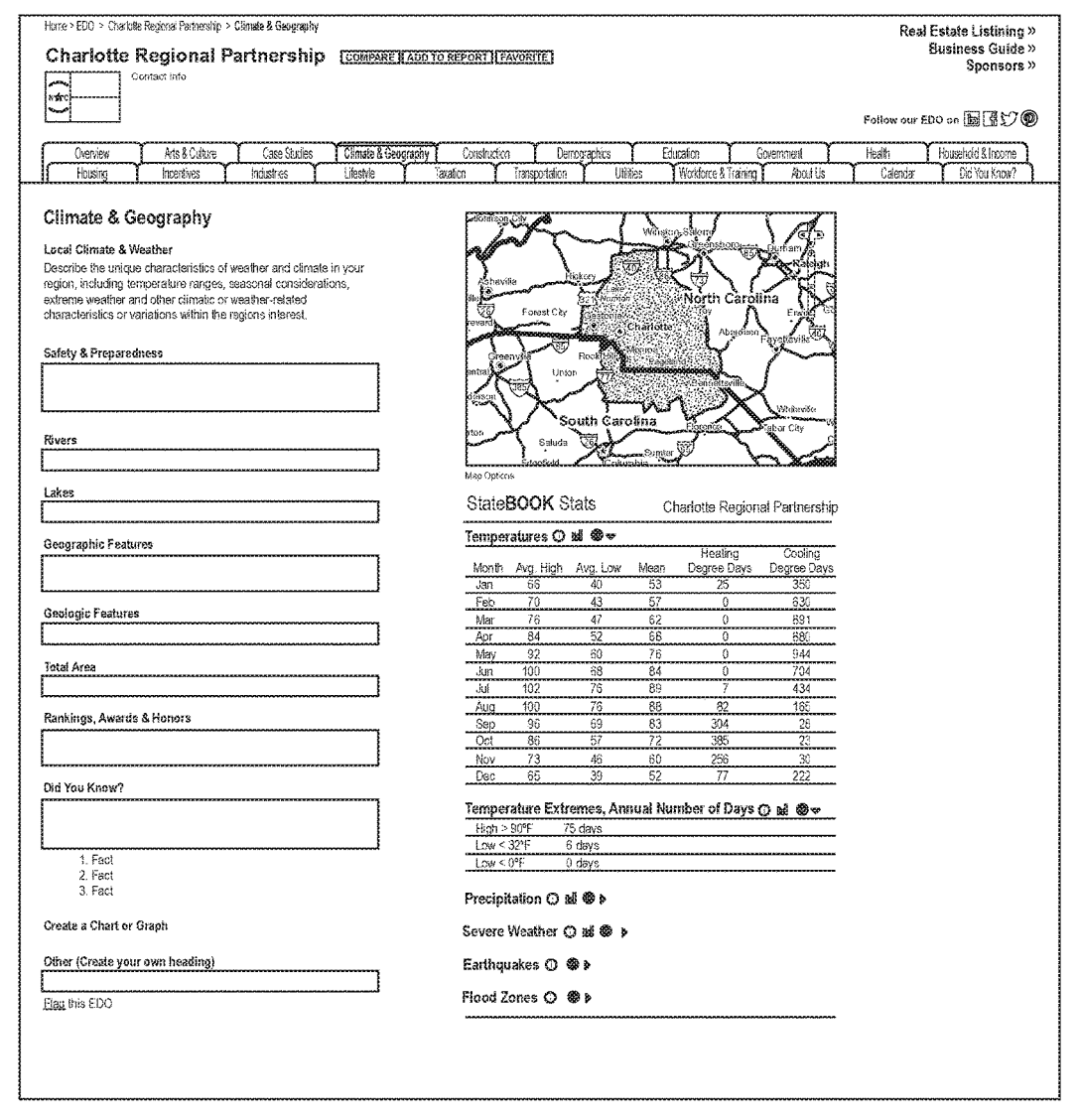
Figure 18:
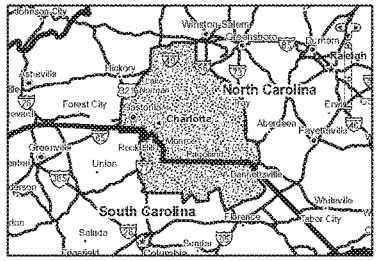
Figure 19:
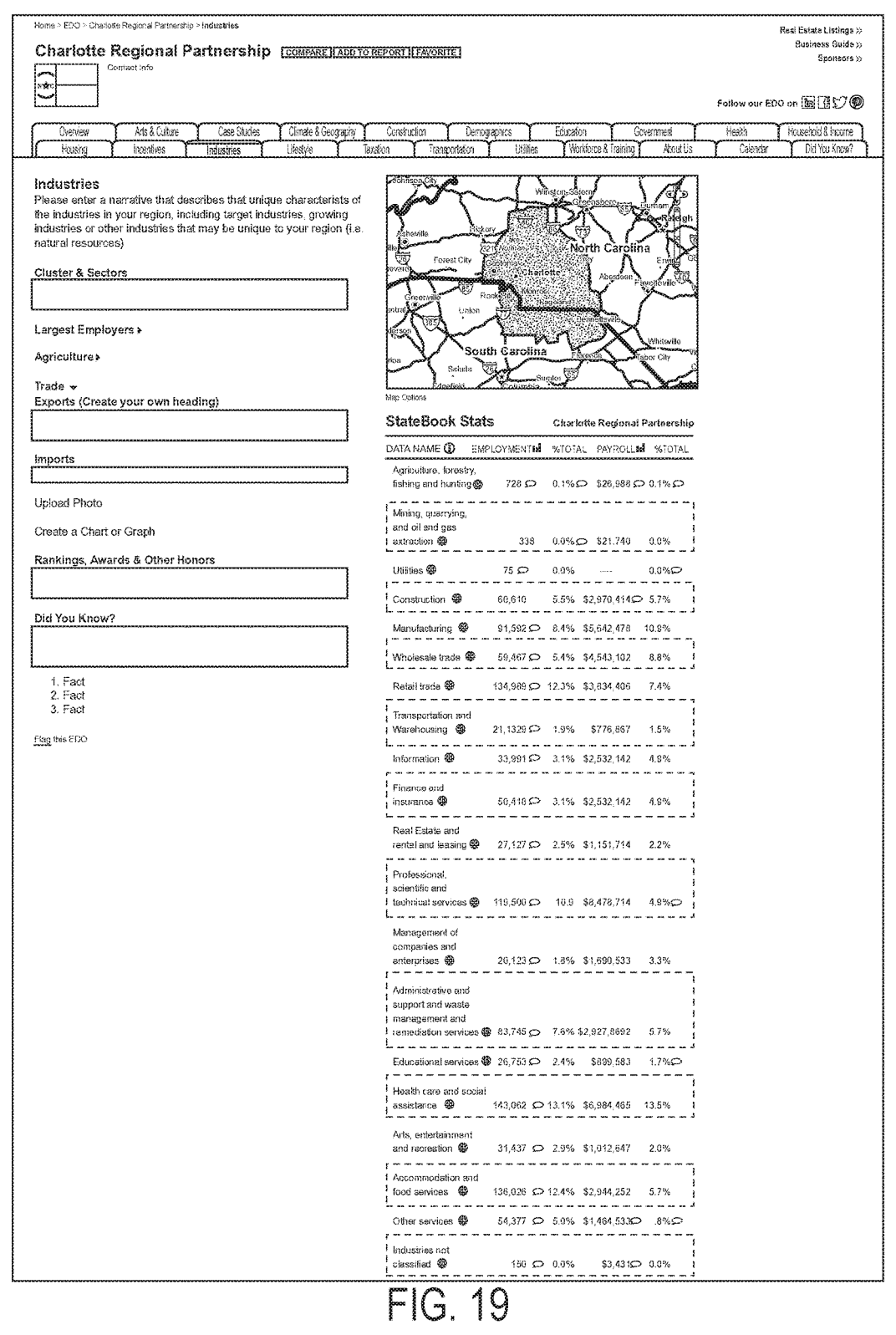

FIGS. 15-20 are screen shots of an exemplary EDO microsite available on the system (Charlotte Regional Partnership). This microsite combines information supplied by the EDO (shown on the left hand column), and statistics from the system (shown on the right hand column). To obtain authority for control of its microsite, an EDO must first communicate with the service provider to subscribe and be authenticated. Thereafter, the EDO would have the ability to create, edit and control some of the content appearing on the microsite, thereby enabling the EDO to market its territory and services to users who may be interested in the region and the services available from the EDO. As shown on FIG. 15, the microsite display can include EDO contact information and an email link, links to relevant EDO social media sites, and commentary provided by the EDO on its location, on incentives available in the territory, and on services provided by the EDO. As shown in FIGS. 15-19, the display for the microsite may include access to different datasets for the EDO's region, accessible via tabs, thus enabling the EDO to post detailed information according to the data to be displayed. FIG. 16 shows the dataset and commentary for Arts & Culture within the region, while FIG. 17 shows the dataset and commentary for Climate & Geography in the region. FIG. 18 shows the dataset and commentary for Government in the region, while FIG. 19 shows the dataset and commentary for Industries in the region. The information posted by the organization can include commentary concerning data trends and anomalies, or highlight and discuss errors in the data utilized and displayed by the service provider. The EDO may also provide its own data on the microsite. The microsite pages also indicate the source of the data via footnotes, or data information bubbles, for example as depicted in the FIGS. 15-18 as an "i" appearing in a circle next to the data. The EDO information can also include, for example, regional news of interest, historical data including data that can be depicted via a graph when a graph button is activated, or local information depicted on a map of the region associated with the organization. As with other pages displayed by the system, the data can be copied, graphed, compared, or saved to a report. Further, the microsite may include links to organizations associated with the organization that controls the microsite. For example, in this case, the Charlotte Regional Partnership is a regional EDO made up of several smaller local development organizations. Each of the participating smaller EDOs may have and control their own microsite within the system.

Figure 20:
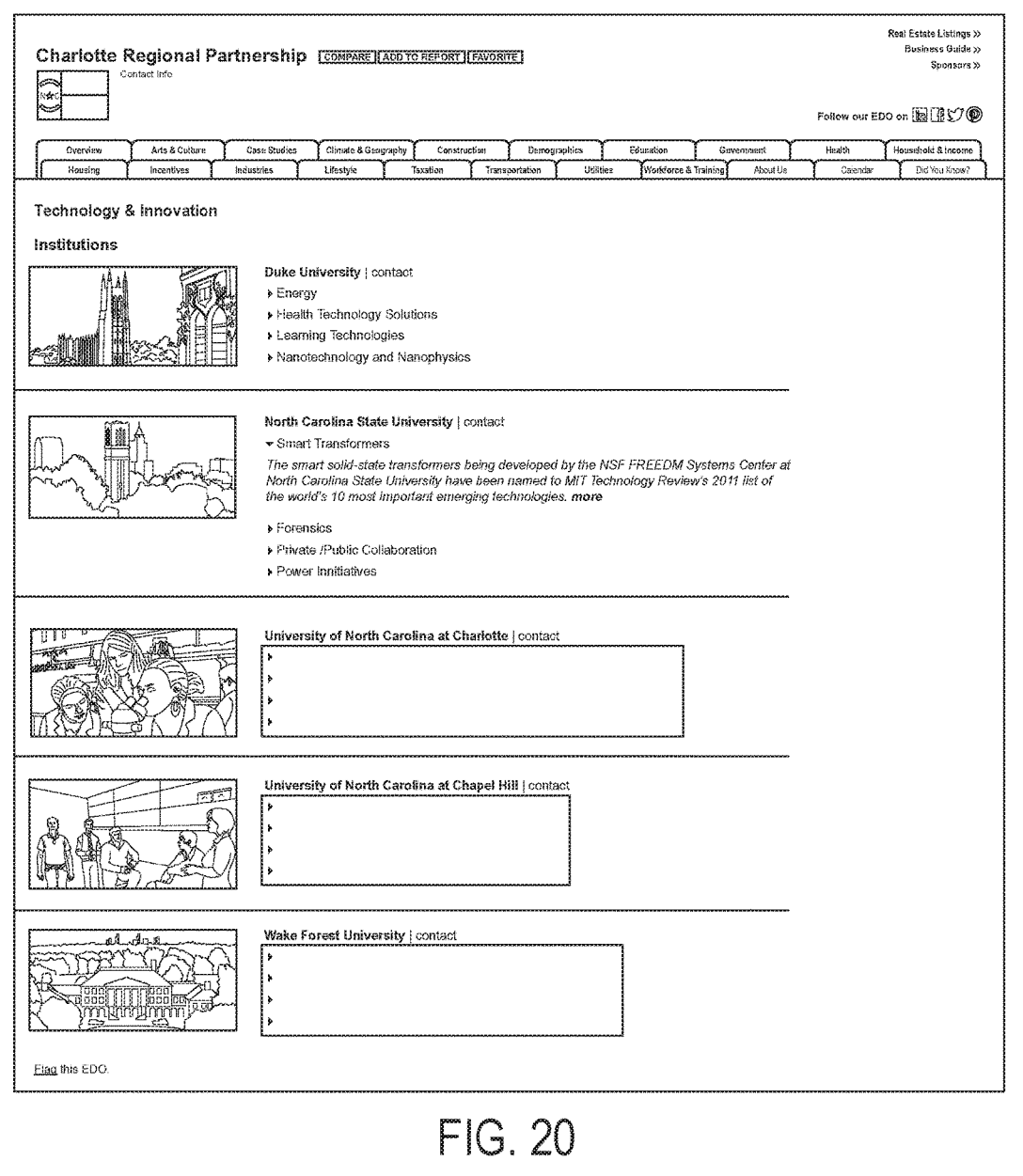

FIG. 20 shows a screen shot an EDO which provides information regarding technology and innovation in the applicable region. This page may depict universities and other institutions that are actively engaged in noteworthy technological research or that have research facilities available for collaboration and use. In an alternate embodiment, such information may be provided by the system, utilizing data obtained from publicly available or private sources. In such case, the EDO may be permitted to provide commentary regarding the data made available by the system.

The systems and methods of the present invention may also include a proposal generator application that enables a user to create custom requests for information (RFI) for posting to members or for transmission to EDOs. Through this functionality, a user such as a corporation or a site selector can create an RFI for transmission to specific EDOs or EDOs associated with regions of interest. The RFI feature could be implemented manually, where the user initiates a RFI request, manually populates a form with questions and applicable data, and identifies the specific entities that are to receive the form. However, in an alternative embodiment, the user selects data points to be included in the RFI, for example, by checking data fields for inclusion on a form presented to the user. Next, the user can add questions to the request. These questions could be directed to all recipients or to specific recipients. Thereafter, the user can search for or identify geographical regions of interest, and select either entities associated with selected geographies (states, regions, counties, core based statistical areas) or specific EDOs, to receive the RFI. The user may also invite entities to bid on the RFI. Once geographies and/or EDOs are selected, the RFI may be posted on a web portal in such a manner that the specifically named EDOs, or the EDOs associated with the selected geographies, are notified and permitted to access the RFI. Recipients may be notified via an alert system, text message, email, or simply when an EDO having access to RFIs logs in to the portal. In the alternative, the system could be configured such that the appropriate EDOs receive a copy of the RFI. The system can be configured so that only EDOs that pay to participate, or are otherwise designated participating members by the system, may actually view or respond to the RFI.

The system may be configured such that when the RFI is accessed by an EDO, the information for the region associated with that EDO auto populates for any data points in the RFI selected by the posting user. The EDO may thereafter draft a response to the RFI, answer any questions, provide commentary to the statistics addressed in the RFI, or further elaborate on a data points within the RFI. They may also attach documents, charts, graphs and map layer illustrations to provide a more comprehensive response, using tools provided by the system. Once complete, the response may be returned to the posting user via the system. The system would thereafter notify the posting user, who may then access, view, compare and print completed RFI responses using tools provided by the system.

It should be further appreciated that the system could include additional add-on applications, such as website development tools that enable users to create a custom website linked to the system, or tools to build and manage EDO websites, or other applications known to persons skilled in the art. The systems and methods may also include application programming interfaces (APIs), including, for example, an API that enables EDOs and other organizations to incorporate links into privately operated websites and other electronic marketing efforts that cause the system to generate customized datasets that may be displayed on such websites and in such materials. Such APIs may enable these users to select the regions and type of data to be incorporated into the customized dataset to be added to their own website.

The system may also provide community-specific calendars, and access and links to training programs, seminars, conferences and webinars. The system could also include tools for confidential communication with EDO's or with local service providers, such as, for example, realtors, accountants, engineers, site developers, contractors and attorneys.

The system may also include an interactive social media platform, which could include information on popular searches, new regional incentives, recent EDO activities and events, and other current information relevant to regional economic development and business users. This feature may be available, for example, via a "What's trending" tab or button. Further, users may be able to access featured communities, or post queries to the wider networked community via a bulletin board or a communications subsystem, built into the broader system.

The above paragraphs provide examples of how the inventive systems and methods may be configured to handle geographic information. However, given the complexity of geographic information systems, and the number of methodologies that may be employed to collate the statistical data, these examples should not be viewed as exclusive. The described system may be adopted and implemented in additional ways without departing from the spirit and scope of the invention.

It should be appreciated that such systems and methods for networking users of a GIS data management system may include several additional features. In one embodiment, for example, users may provide user-specific data that may be superimposed onto a map interface having particular geographical boundaries. Such a feature may be desirable for users wanting to advertise their local business to other users who are interested in a particular region and who access maps with certain geographical boundaries. For example, a restaurant owner or a realtor may want to advertise the location of his/her restaurant or office when certain regions of a map are displayed, or display the location on the map to all users who zoom in to a particular proximity to where the restaurant or realtor is located. In another embodiment, advertisement data may be superimposed onto a particular location on the map interface (e.g., a location on the map consistent with where the restaurant or realtor is located) and may include a hyperlink to further user-specific data (e.g., videos, documents, virtual tours, etc.).

Although the systems and methods of the present invention have been described in the context of a geographical information system, persons skilled in the art will recognize that the disclosed systems and methods may be utilized for researching, identifying and comparing other types of data and information collected or collated by various organizations. For example, the systems and methods of the present invention may be utilized for public safety or public health purposes to identify locations needing specific types of additional resources of services. For instance, information related to diabetes, obesity and child development may be made accessible through the GIS website. In yet another embodiment, the system might be used to identify, research, compare and track expenditures and performance of federal, state or local government programs for infrastructure improvement, commercial or residential construction, workforce training or public assistance. Such a system could be utilized to manage distribution of funds or benefits, and to analyze whether such programs are effective, on a national, regional, state or local basis.

In general, the foregoing systems and methods may be implemented on a computer system and network, as depicted in FIG. 9. This system may comprise, e.g., a desktop, a laptop, a workstation, etc., or be implemented as part of a client-server configuration. The computer system generally includes a processor, input/output (I/O) means, memory, and a bus. The processor may comprise a single processing unit, or be distributed across one or more processing units in one or more locations, such as in a client-server configuration or a server-server configuration. The memory may comprise any known type of data storage, including magnetic media, optical media, random access memory (RAM), read-only memory (ROM), a data cache, a data object, etc. Further, the memory may reside at a single physical location, comprising one or more types of data storage, or be distributed across a plurality of physical systems in various forms, or through a cloud-based storage system. The input/output means may comprise any system for exchanging information to/from an external resource. External devices/resources may comprise any known type of external device, including a monitor/display, speakers, storage, another computer system, a hand-held device, a keyboard, a mouse, a voice recognition system, or a printer, facsimile, or pager, etc. The bus provides a communication link between each of the components in the computer system, and may comprise any known type of transmission link, including electrical, optical, wired, wireless, satellite, etc. Although not shown, additional components, such as cache memory, communication systems, system software, etc., may be incorporated into computer system. Access to the computer system may be provided over a network such as the Internet, a local area network (LAN), a wide area network (WAN), or a virtual private network (VPN), etc. Communication could occur via a direct hardwired connection, or via an addressable connection that may utilize any combination of wireline, wireless, or satellite transmission methods. Moreover, conventional network connectivity, such as Token Ring, Ethernet, WiFi or other conventional communications standards could be used, as well as a conventional TCP/IP sockets-based protocols. One or more Internet service providers could be used to establish interconnectivity.

It should be appreciated that the services and methods of the present invention could be offered on as a business, on a subscription or anonymous basis, without or without charges for use of the system. For example, the computer system and services could be created, maintained and/or deployed by a service provider that offers the functions described herein at different levels to different types of customers. That is, a service provider could provide a free, restricted interface to non-paying customers, while allowing paying customers full search and analysis capabilities.

The systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product that comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing examples have been provided merely for the purpose of explanation and are in no way to be construed as limiting of the methods and systems disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A GIS data appliance for identifying geographic locations of interest comprising:
 a geospatial database module for creating geographic boundaries for the GIS data appliance, the geospatial database module programmed to: (1) import geospatial boundaries for predefined statistical regions, the geospatial boundaries for the predefined statistical regions being imported from a plurality of data sources, (2) divide a map into the predefined statistical regions, (3) rectify and re-project the predefined statistical regions into multiple resolution region geometries chosen for spatial processing and geospatial database storage, (4) assign identifiers to each of the multiple resolution region geometries, and (5) store the multiple resolution region geometries along with their respective identifiers in a geospatial database, wherein the geospatial database is formatted to allow for topographic and geometric operations;
 a data loader working in conjunction with the geospatial database to ingest data derived from authoritative sources and third-party economic development organizations, to associate the data with a specific multiple resolution region geometry by comparing a spatial geometry of the data with the multiple resolution region geometries thereby identifying relationships between the spatial geometry and the multiple resolution region geometries, to geocode and categorize the data according to the specific multiple resolution region geometry and the relationships between the spatial geometry and the multiple resolution region geometries, and to persist the data to a relational database for retrieval;

a content management system to receive, process, store and retrieve third-party economic development organization content to and from the relational database for use within the system;

a processor to search for data responsive to user queries, retrieve data from the relational database and the content management system, and to generate user interfaces;

a geospatial server to render maps of responsive regions returned by the processor in response to user queries;

a server to route requests to and from users to the processor, the geospatial server, and the content management system;

an internet connection to enable the GIS data appliance to access GIS data and external content from a plurality of sources, and to enable users to access the data appliance to run queries and receive and review maps and data;

wherein the server to route requests is configured to receive via the internet connection queries from users seeking the identification of geographic regions responsive to user selected search criteria, the processor is configured to access the content management system and the relational database to process the user queries and to communicate with the geospatial server to provide the user with an interactive geographical display of responsive locations on a map, such that the user may view identified responsive locations on the map, select one or more such locations to view, analyze and compare data associated with such locations, and select to view a region type within the multiple resolution region geometries.

2. The GIS data appliance according to claim 1 wherein the system is configured to identify and display economic development organizations associated with regions responsive to a user's queries, and to permit the user to access information associated with and edited by such organizations when selecting an identified region.

3. The GIS data appliance according to claim 1 wherein the data derived from the authoritative sources and the third-party economic development organizations is relevant to strategic location planning and comparison activities.

4. The GIS data appliance according to claim 1 wherein the predefined regions of interest include at least one of census block groups, census tracts, county boundaries, metropolitan statistical areas, Tribal Lands and State borders.

5. The GIS data appliance according to claim 1 wherein the data derived from authoritative sources and third-party economic development organizations is integrated into the GIS data appliance prior to being ingested by the data loader.

6. The GIS data appliance according to claim 1 wherein the region type is at least two of state, county, subcounty, MSA and EDO.

* * * * *